United States Patent
Rumiantsau et al.

(10) Patent No.: US 11,762,852 B2
(45) Date of Patent: Sep. 19, 2023

(54) METADATA-BASED TRANSLATION OF NATURAL LANGUAGE QUERIES INTO DATABASE QUERIES

(71) Applicant: ServiceNow, Inc., Santa Clara, CA (US)

(72) Inventors: Mikhail Rumiantsau, Mountain View, CA (US); Aliaksei Vertsel, Mountain View, CA (US); Seth Tucker Stafford, San Carlos, CA (US); Alexey Zenovich, San Diego, CA (US); Alyaksandr Zaytsav, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/456,779

(22) Filed: Nov. 29, 2021

(65) Prior Publication Data
US 2022/0083546 A1    Mar. 17, 2022

Related U.S. Application Data

(63) Continuation of application No. 16/694,246, filed on Nov. 25, 2019, now Pat. No. 11,188,530.

(51) Int. Cl.
*G06F 16/2452* (2019.01)
*G06F 16/22* (2019.01)
(Continued)

(52) U.S. Cl.
CPC .... *G06F 16/24522* (2019.01); *G06F 16/2282* (2019.01); *G06F 16/2445* (2019.01); *G06F 16/252* (2019.01)

(58) Field of Classification Search
CPC .......... G06F 16/24522; G06F 16/2282; G06F 16/2445; G06F 16/252
See application file for complete search history.

(56) References Cited

U.S. PATENT DOCUMENTS

| 6,609,122 B1 | 8/2003 | Ensor |
| 7,028,301 B2 | 4/2006 | Ding |

(Continued)

OTHER PUBLICATIONS

Context-Free Grammars, 6 pages, downloaded from https://www.cs.rachester.edu/~nelson/courses/csc_173/grammars/cfg.html, Oct. 29, 2019.

(Continued)

*Primary Examiner* — Albert M Phillips, III
(74) *Attorney, Agent, or Firm* — Fletcher Yoder, PC

(57) ABSTRACT

A system may include: a database table, a grammar containing metadata-referencing non-terminals, and metadata mapping the metadata-referencing non-terminals into alternative terms for the table and a column therein. The system may also include a server device configured to: (i) receive a natural language query, the grammar, and the metadata, wherein the natural language query contains a first alternative term for the table and a second alternative term for the column; (ii) parse, using the grammar, the natural language query into a series of terminals and non-terminals including a first metadata-referencing non-terminal that the metadata maps to the first alternative term and a second metadata-referencing non-terminal that the metadata maps to the second alternative term; (iii) identify, based on the first metadata-referencing non-terminal, the table; (iv) identify, based on the second metadata-referencing non-terminal, the column; and (v) generate, based on the table and the column as identified, a database language query.

15 Claims, 16 Drawing Sheets

(51) Int. Cl.
*G06F 16/242* (2019.01)
*G06F 16/25* (2019.01)

(56) References Cited

U.S. PATENT DOCUMENTS

| | | | |
|---|---|---|---|
| 7,062,683 B2 | 6/2006 | Warpenburg | |
| 7,131,037 B1 | 10/2006 | LeFaive | |
| 7,170,864 B2 | 1/2007 | Matharu | |
| 7,610,512 B2 | 10/2009 | Gerber | |
| 7,617,073 B2 | 11/2009 | Trinon | |
| 7,689,628 B2 | 3/2010 | Garg | |
| 7,783,744 B2 | 8/2010 | Garg | |
| 7,890,802 B2 | 2/2011 | Gerber | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,224,683 B2 | 7/2012 | Manos | |
| 8,266,096 B2 | 9/2012 | Navarrete | |
| 8,457,928 B2 | 6/2013 | Dang | |
| 8,478,569 B2 | 7/2013 | Scarpelli | |
| 8,674,992 B2 | 3/2014 | Poston | |
| 8,689,241 B2 | 4/2014 | Naik | |
| 8,707,252 B1 | 4/2014 | Alexeev et al. | |
| 8,743,121 B2 | 6/2014 | De Peuter | |
| 8,887,133 B2 | 11/2014 | Behnia | |
| 9,239,857 B2 | 1/2016 | Trinon | |
| 9,535,737 B2 | 1/2017 | Joy | |
| 9,557,969 B2 | 1/2017 | Sharma | |
| 9,792,387 B2 | 10/2017 | George | |
| 11,138,205 B1 * | 10/2021 | Mohajer | G06F 16/2455 |
| 11,288,264 B1 * | 3/2022 | Vanhooser | G06F 16/2282 |
| 2018/0336198 A1 | 11/2018 | Zhong et al. | |
| 2020/0110838 A1 | 4/2020 | Pasha et al. | |

OTHER PUBLICATIONS

Regular Expressions (Regex) Tutorial, 11 pages, downloaded from https://www.ntu.edu.sg/home/ehchua/programming/howto/Regexe.html, Nov. 2018.

* cited by examiner

| 610 ↓ | 612 ↓ | 614 ↓ | 616 ↓ | 618 ↓ | 620 ↓ | 622 ↓ | 624 ↓ | 626 ↓ | 628 ↓ | 630 ↓ |
|---|---|---|---|---|---|---|---|---|---|---|
| OPENED BY | OPENED AT | SHORT DESC | DESCRIPTION | CATEGORY | URGENCY | ASSIGNED TO | STATE | RESOLUTION | CLOSE CODE | CLOSED AT |
| BOB SMITH | 2018-02-07 9:56AM | CAN'T CONNECT TO EMAIL | MY EMAIL CLIENT IS NOT DOWNLOADING NEW EMAILS. I AM CONNECTED TO THE WIRELESS NETWORK AND CAN ACCESS THE INTERNET, BUT MY CLIENT KEEPS REPORTING THAT IT IS UNABLE TO ACCESS THE SERVER. | EMAIL | 1 | ALICE JONES | 7 | BOB'S LAPTOP WAS CONNECTED TO THE "GUEST" WIRELESS NETWORK, WHICH IS OUTSIDE OF THE FIREWALL. I TOLD HIM THAT HE COULD EITHER USE THE VPN TO ACCESS HIS EMAIL, OR CONNECT TO THE "EMPLOYEE" WIRELESS NETWORK, WHICH REQUIRES THE PASSWORD BUT IS INSIDE THE FIREWALL. | SOLVED (PERMANENTLY) | 2018-02-07 10:10AM |
| CHRIS MILLER | 2018-02-07 11:02AM | NEED HELP RESETTING MY PASSWORD | I FORGOT MY DOMAIN PASSWORD. CAN YOU RESET IT FOR ME? | LOGIN | 2 | ALICE JONES | 5 | | | |

```
QUERY ::= INTRO ? SORT_CLAUSE ? CONDITION_LIST SORT_CLAUSE ?

INTRO ::= SHOW ? CONDITION_LIST ENTITY

CONDITION_LIST ::= CONDITION ? CONDITION ? CONDITION ? CONDITION ? CONDITION ? CONDITION ? CONDITION ?
CONDITION ?

CONDITION@ ::= WHERE ? CONDITION_CLAUSE

WHERE ::= ( where | which | for | with | and | or ) ? ( have | has ) ?

CONDITION_CLAUSE ::= NUM_CLAUSE | MDATA_CLAUSE | STRING_CLAUSE | DATE_CLAUSE | BOOL_CLAUSE
STRING_CLAUSE ::= STRING_COLUMN EQUALS ? STRING
NUM_CLAUSE ::= NUM_COLUMN EQUALS ? NUM
DATE_CLAUSE ::= DATE_COLUMN ( EQUALS | in | on | at ) ? DATE
BOOL_CLAUSE ::= BOOL_COLUMN EQUALS ? ( true | false ) @BOOL_VALUE
MDATA_CLAUSE ::= ( STRING_COLUMN | NUM_COLUMN ) EQUALS ? METADATA_VALUE | METADATA_VALUE (
        STRING_COLUMN | NUM_COLUMN )

ENTITY@ ::= THE ?? METADATA_ENTITY
STRING_COLUMN@ ::= THE ?? METADATA_STRING
BOOL_COLUMN@ ::= THE ?? METADATA_BOOL
DATE_COLUMN@ ::= THE ?? METADATA_DATE ( date | day ) ?
NUM_COLUMN@ ::= THE ?? METADATA_NUM THE ::= the | a | an | any | every | each KEYWORD ::= which | whose | that | where | who | and | an | or | from | by | in | during | of | for | on | at | with | do | have | has | I | we
        | they | grouped | groupped |group | min | max | count | sum | number | total | avg | average | the | asc | desc | all | is |
        monthly | active | users | how | many | are | as | to | a | most | contain | contains | include | includes | begin | begins | start
        | starts | end | ends | best | sort | in | for | each

WORD ::= /.+/ & ~KEYWORD

STRING@ ::= WORD WORD ?? WORD ?? WORD ?? WORD ?? WORD ?? WORD ?? WORD ?? WORD ?? WORD ??
        WORD ?? WORD ?? WORD ??

NUM@ ::= /[-+]?\$?\D+[\D,\.]*/

/DD/@ ::= /0?[0-9]|[1-2][0-9]|3[01]/
/MM/@ ::= /0?[0-9]|10|11|12/
/YY/@ ::= /(19|20)?\D\D/

DATE@ ::= /${YY}-${MM}-${DD}|${MM}\/${DD}\/${YY}/

EQUALS ::= is | equals | /=/ | /==/

SORT_CLAUSE@ ::= and ? ( sort | sorted | order | ordered ) by ? ( STRING_COLUMN | BOOL_COLUMN | DATE_COLUMN
        | NUM_COLUMN )

SHOW ::= please ? ( show | select | display | get | find ) me ?
```

FIG. 11A

```
{
  "METADATA": [
    {                                    ← 1112
      "TABLE": "INCIDENT",
      "ENTITY": "ENTITY",
      "METADATA": [ ["INCIDENT", "TICKET"] ]
    },
    {
      "COLUMN": "OPENED_BY",              ← 1114
      "ENTITY": "STRING",
      "METADATA": [ ["OPENED_BY", "OPENED BY", "OPENER"] ]
    },
    {
      "COLUMN": "URGENCY",                ← 1116
      "ENTITY": "NUM",
      "METADATA": [ ["URGENCY", "PRIORITY"] ]
    },
    {
      "COLUMN": "STATE",                  ← 1118A
      "ENTITY": "NUM",
      "METADATA": [ ["STATE", "STATUS"] ]
    },
    {
      "COLUMN": "STATE",                  ← 1118B
      "ENTITY": "VALUE",
      "METADATA": [ ["1", "NEW"], ["2", "IN PROGRESS"], ["3","ON HOLD"], ["4", "ASSIGNED"],
["5","WORKING"], ["6", "RESOLVED"], ["7", "CLOSED"], ["8","CANCELLED"] ]
    },
    {
      "COLUMN": "OPENED_AT",              ← 1120
      "ENTITY": "DATE",
      "METADATA": [ ["OPENED_AT", "OPENED", "TIME OPENED", "FILED"] ]
    }
  ]
}
```

METADATA-BASED TRANSLATION OF NATURAL LANGUAGE QUERIES INTO DATABASE QUERIES

CROSS-REFERENCE TO RELATED APPLICATION

This application is a continuation of U.S. patent Ser. No. 16/694,246, filed Nov. 25, 2019, and entitled, "META-DATA-BASED TRANSLATION OF NATURAL LANGUAGE QUERIES INTO DATABASE QUERIES," which is incorporated by reference herein in its entirety for all purposes.

BACKGROUND

A remote network management platform may take the form of a hosted environment that includes computational instances providing application Platform-as-a-Service (aPaaS) services to users, particularly to operators of a managed network such as an enterprise. Such services may take the form of web-based portals and/or software applications that the enterprises, and possibly both internal and external users thereof, may access through computational instances of the remote network management platform.

Many services and interfaces that a remote network management platform provides can be database-driven. That is, such services and interfaces can involve the remote network management platform retrieving data for users, often in response to user queries. Thus, the efficiency in which the remote network management platform retrieves and otherwise manages its data can impact the effectiveness of such services and interfaces.

SUMMARY

In managed networks, particularly large-scale managed networks with hundreds or thousands of users and computing devices and thus large amounts of data (e.g., terabytes), databases are frequently searched by a variety of users to obtain desired data. For example, there can be hundreds or thousands of searches per day across a managed network. Furthermore, the type of data searched, the amount of data searched, the manner in which the data is organized and stored, and the manner in which users attempt to search for data can change over time and can also vary per user, per department, per application or service being used for searching, or vary in another manner.

As data searches within managed networks increase and/or otherwise change in complexity or frequency, it can be difficult for the remote network management platform to provide services that efficiently and consistently parse user queries and obtain desired results. To address these and other issues, the embodiments described herein provide a remote network management platform that is configured to enable natural language processing of user requests (e.g., queries) for data and other information managed by the remote network management platform for the managed networks.

Notably, the linguistic grammar that defines the supported natural language can be dynamically adapted and expanded by users of various computational instances through use of customized metadata per instance. This metadata may describe the database schema (e.g., table names, column names, types of data stored in these columns) using various alternative terms. The alternative terms may be used in natural language queries that are parsed according to the grammar and in view of the metadata to form database language queries. Thus, potentially many natural language queries can result in the same database language query.

Further, this flexible approach allows users to modify the vocabulary of the grammar without changing its form. Therefore, as databases add more tables and columns, grammars supporting natural language queries do not need to be re-written. Also, different managed networks using different computational instances can utilize the same grammar but formulate customized metadata to meet their unique needs.

Moreover, one or more dedicated or partially-dedicated server devices may carry out the parsing of the grammar in accordance with the metadata. These server devices may be distinct and separate from devices that make up computational instances that are dedicated to managed networks. As parsing can be a computationally-intense endeavor, separating the parsing of the grammar from carrying out the actual database queries can improve performance of the computational instances. Notably, the responsiveness of the web-based interfaces of these instances can be improved by centralizing the parsing on the aforementioned server devices.

Accordingly, a first example embodiment may involve a computational instance disposed within a remote network management platform, wherein the computational instance is associated with a managed network and contains one or more databases, wherein the one or more databases include: a table with a plurality of columns, a grammar containing metadata-referencing non-terminals and configured for parsing natural language queries from users of the managed network, and metadata mapping the metadata-referencing non-terminals into alternative terms for the table and the plurality of columns. A server device, disposed within the remote network management platform and separate from the computational instance, may be configured to: (i) receive, from the computational instance, a natural language query, the grammar, and the metadata, wherein the natural language query contains a first alternative term for the table and a second alternative term for a column of the plurality of columns; (ii) parse, using the grammar, the natural language query into a series of terminals and non-terminals, wherein the non-terminals include a first metadata-referencing non-terminal that the metadata maps to the first alternative term and a second metadata-referencing non-terminal that the metadata maps to the second alternative term; (iii) identify, based on the first metadata-referencing non-terminal, the table; (iv) identify, based on the second metadata-referencing non-terminal, the column; and (v) generate, based on the table and the column as identified, a database language query corresponding to the natural language query A second example embodiment may involve receiving, from a computational instance, a natural language query, a grammar, and metadata, wherein the natural language query contains a first alternative term for a table of a database and a second alternative term for a column in the table, wherein the grammar contains metadata-referencing non-terminals and is configured for parsing natural language queries, and the metadata maps the metadata-referencing non-terminals into alternative terms for the table and the column, and wherein the database is disposed within the computational instance. The second example embodiment may also involve parsing, using the grammar, the natural language query into a series of terminals and non-terminals, wherein the non-terminals include a first metadata-referencing non-terminal that the metadata maps to the first alternative term and a second metadata-referencing non-terminal that the metadata maps to the second alternative term. The second example embodiment may also involve identifying, based on the first metadata-referencing non-terminal, the table. The second example embodiment may also involve identifying, based on the second metadata-referencing non-terminal, the column. The second example embodiment may also involve generating, based on the table and the column as identified, a database language query corresponding to the natural language query.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6 depicts a database table for storing incident reports, in accordance with example embodiments.

FIG. 11A depicts a grammar with metadata-referencing non-terminals, in accordance with example embodiments.

FIG. 11B depicts metadata referenced by the grammar of FIG. 11A, in accordance with example embodiments.

DETAILED DESCRIPTION

Figure 1:
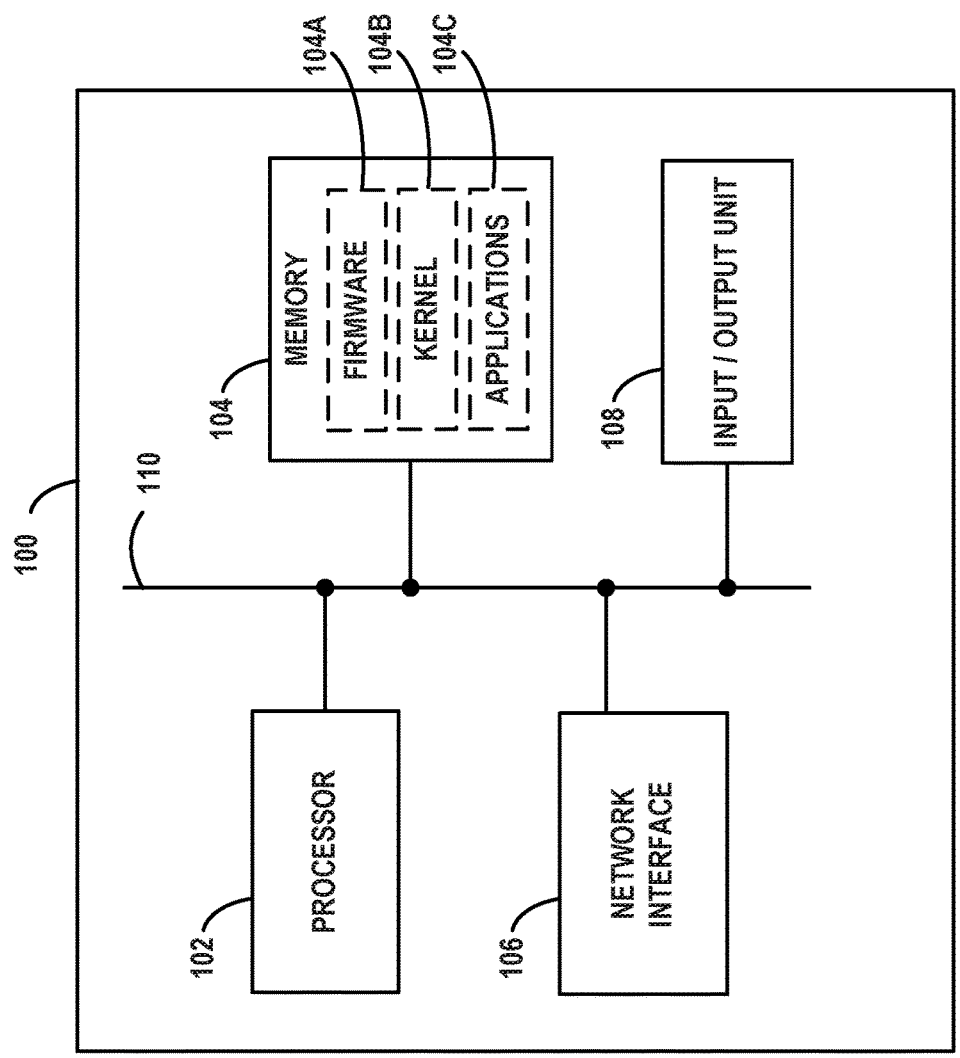
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
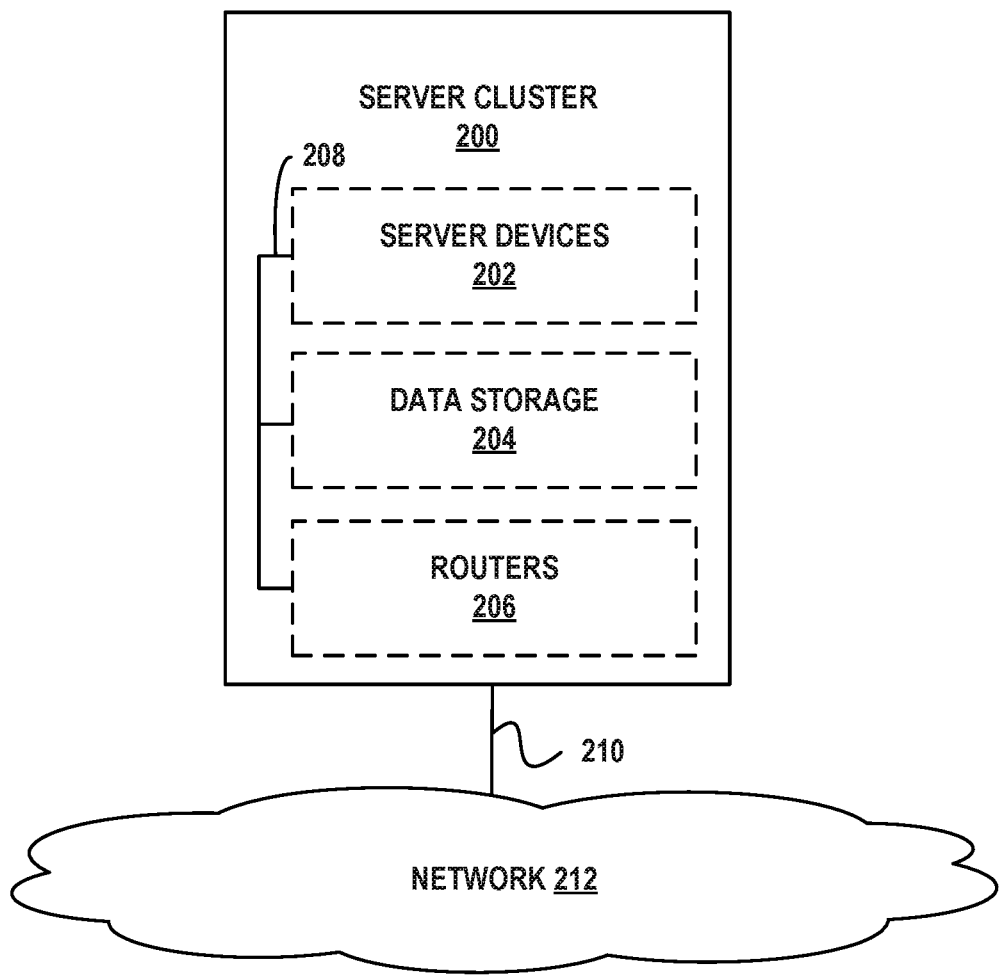
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
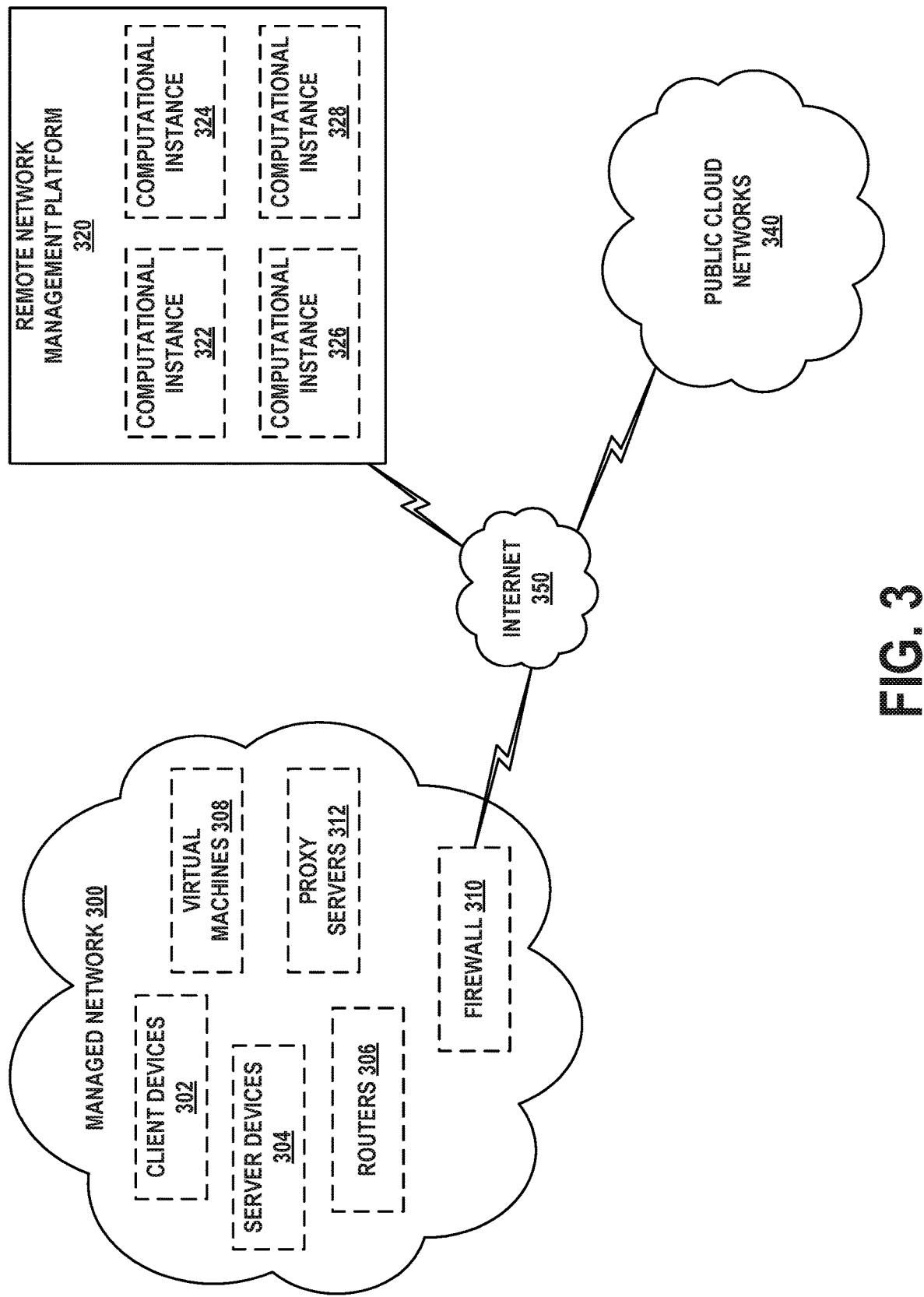
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
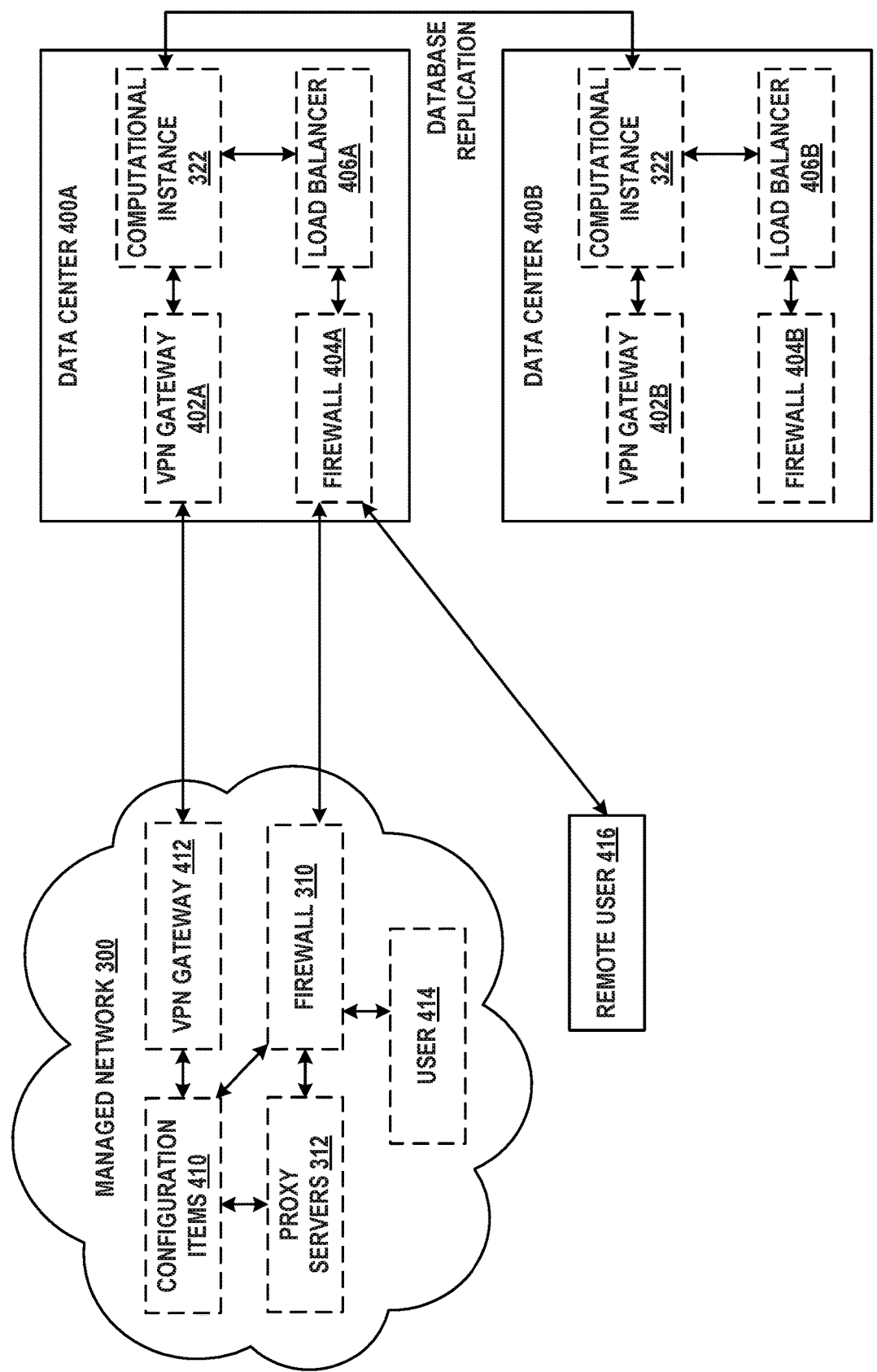
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
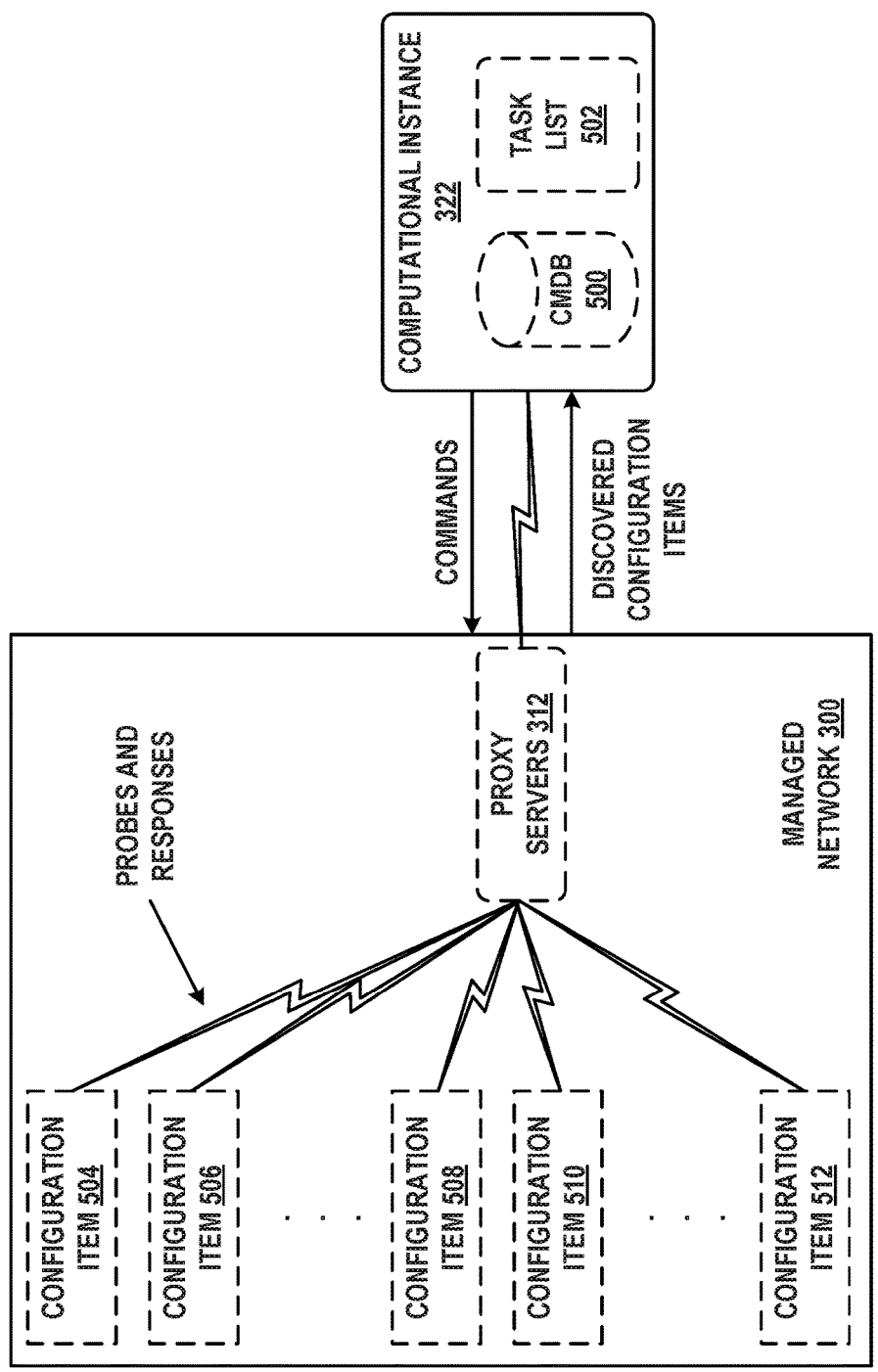
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
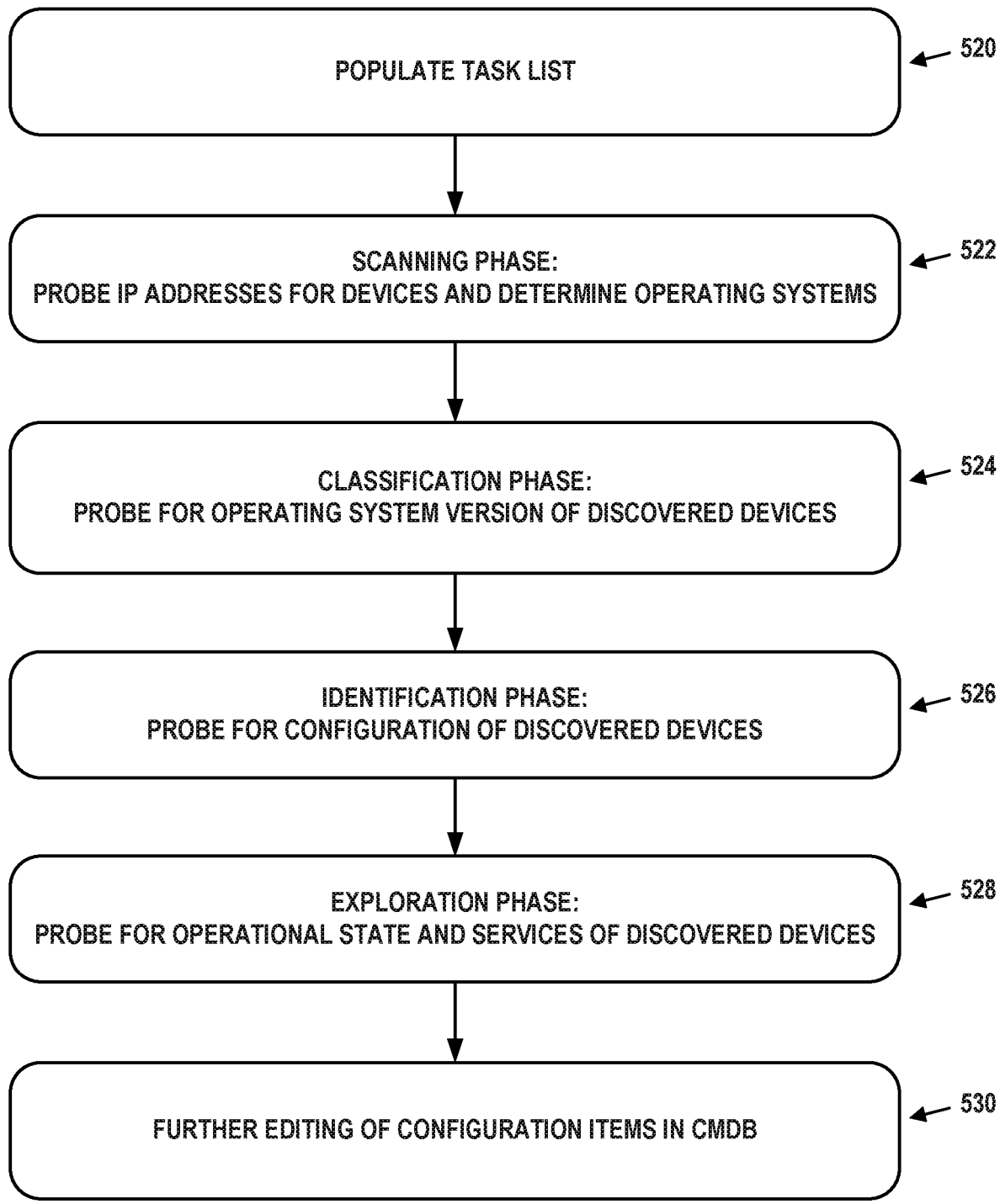
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Database Tables and Query Languages

In order to further illustrate the embodiments herein, this section describes the structure of an example database table and the syntax of an example query language similar to SQL that can be used to search the table (and perhaps other tables as well). While this example focuses on a specific table that stores a particular type of data, the embodiments herein may be used with tables structured in other fashions and storing other types of data.

A. Example Database Table

FIG. 6 depicts an example database table 600 for storing incident reports. In enterprises and other contexts, incident reports are opened by technology users to describe a problem that they have experienced. Each incident report may also be referred to as a record. Table 600 specifies a number of fields in columns 602, and individual incident reports in rows. While incident reports may exist in various formats and contain various types of information, example incident reports 604 and 606 are shown in FIG. 6.

Column 610 identifies the individual or entity that opened the incident report, Bob Smith for incident report 604 and Chris Miller for incident report 606. Column 612 identifies the time at which the incident report was open, in this case 9:56 AM on Feb. 7, 2018 for incident report 604 and 11:02 AM on Feb. 7, 2018 for incident report 606. Column 614 holds text strings that provide a short description of the problem in the respective incident report. Column 616 holds further text strings that provide longer descriptions of the problems, as provided by the originator or IT personnel. These text strings may contain anywhere from a few words to several sentences or more.

Column 618 is a categorization of the incident reports, "email" for incident report 604 and "login" for incident report 606. This categorization may be provided by the originator, the IT personnel to whom the incident report is assigned, or automatically based on the context of the problem description field. Column 620 specifies the urgency of the incident reports, and may operate on a numeric scale from 1 to 4, where 1 indicates critical urgency, 2 indicates high urgency, 3 indicates medium urgency, and 4 indicates low urgency.

Column 622 identifies the IT personnel to whom the incident reports are assigned (if applicable), in this case Alice Jones for both. Column 624 identifies the states of the incident reports. These states may be one of "1" (new), "2" (in progress), "3" (on hold), "4" (assigned), "5" (working), "6" (resolved), "7" (closed), or "8" (cancelled) for instance. Column 626 identifies how the incident report was resolved (if applicable), and may be filled out by the IT personnel to whom the incident is assigned or another individual. Column 628 specifies the closure code of the incident report (if applicable) and can take on values such as "solved (permanently)", "closed (work around)", "closed (cannot reproduce)", etc. Column 630 identifies the time at which the incident report was closed (if applicable), in this case 10:10 AM on Feb. 7, 2018 for incident report 604. The values of columns 626, 628, and 630 remain blank for incident report 606 because that incident report is not yet resolved or closed.

Incident reports, such as incident reports 604 and 606, may be created in various ways. For instance, by way of a web form, an email sent to a designated address, a voicemail box using speech-to-text conversion, and so on. Further, table 600 may be queried using a query language (e.g., SQL). As an example, a query in the form of a text string identifying columns of table 600 and associated values thereof may return a listing of incident reports matching the values specified in those columns.

B. Example Query Language

To that point, a query language may use several keywords to form queries, each keyword associated with respective parameters and operations. Within parameters of some of these keywords, filters or other types of expressions may be used. Below, an example query language is specified. This query language is based on SQL, but other query languages and syntaxes could be used without departing from the relevant embodiments The select keyword specifies columns (e.g., of table 600) that will be represented in query results. The expression "SELECT *" may be used to specify all columns, while the expression "SELECT [col-1, col-2, . . . col-n]" may be used to specific one or more columns. For example, considering table 600, the expression "SELECT opened_by,state" will cause the results to contain only columns 610 and 624.

The FROM keyword specifies the table within a database from which data will be searched. The FROM keyword also allows use of merge and join operations. Merge operations allow specification of two or more tables that, when combined, are to be searched. The FROM keyword also supports inner join, full join, and left join operations to be performed on two or more tables. Each of these join operations combines data from rows of the tables based on common columns contained in the tables.

The WHERE keyword specifies condition(s) on which to filter the rows in the selected table(s). A WHERE expression may include comparison (e.g., '=', '<', '>') and/or logical (e.g., 'and', 'or', 'not') operators.

The LIMIT keyword specifies how many rows are to be returned. For example, the expression "LIMIT 20" specifies that result contain at most 20 rows.

The ORDER BY keyword specifies a column on which to order the displayed output. For example, the expression "ORDER BY urgency" orders the output in ascending order of urgency.

Given the keywords above and their defined usage, numerous powerful queries can be formed by combining them in various ways. For example, Query 1 (shown below) would return the values of the short description, category, and state columns for all incident reports assigned to Alice Jones. In the context of table 600, output from both incident reports 604 and 606 would be returned. On the other hand, Query 2 (also shown below) would return the values of the short description and category columns for all incident reports assigned to Alice Jones and in the "working" state. Thus, only output from incident report 606 would be returned.

| Query 1 |
|---|
| SELECT short_description,category,state<br>FROM "incident"<br>WHERE assigned_to = "Alice Jones"<br>LIMIT 10 |

| Query 2 |
|---|
| SELECT short_description,category<br>FROM "incident"<br>WHERE assigned_to = "Alice Jones" and state = "working"<br>LIMIT 10 |

Numerous additional queries may be formed by combining the keywords and their parameters in various ways. Thus, the embodiments herein are not limited by the queries shown. Further, different query syntaxes may be used.

VI. Example Grammars and Query Parsing

Examples related to query parsing (possibly using the aforementioned example query language) will be described herein primarily for database queries in the context of a managed network and a remote network management platform, such as managed network 300 and remote network management platform 320. However, these examples can also be applied at a more general level outside of this particular context, such as user queries made with an Internet search engine.

It can be desirable for a remote network management platform to provide an efficient, consistent, and secure means for storing, retrieving, and otherwise managing data, particularly for large-scale enterprises with hundreds or thousands of users and computing devices and thus large amounts of data (e.g., terabytes) that need to be managed. Efficient, consistent, and secure data management can affect the efficiency, consistency, and overall quality of the services, interfaces, and other functions that the remote network management platform provides.

An aspect of data management is the ability to efficiently retrieve data requested by a user in a query, particularly when there is a large amount of data through which to search for the specific information that the user seeks. At a high level, for example, this can involve a computing device receiving a text query from a user, processing the query, and using the processed query to retrieve data from one or more databases and provide the data as a query result for the user. However, for various reasons, including those described below in this section, some manners of processing user queries, and thus retrieving data that the user desires, can be challenging, time consuming, or otherwise inefficient.

One manner of processing user queries involves the concept of keyword searching. In systems that support keyword searching, a keyword-based query is received from a user and searched in one or more index databases. Keyword-based searches interpret the user query by focusing only on identifiable keywords. Because of this, the keyword-based search can produce unsatisfactory results, often returning irrelevant data. Further, in some cases, excessive amounts of data (e.g., millions of documents) are retrieved in response to a simple keyword query, which often makes it difficult for a user to find the needed information. The undesirable performance of keyword-based search can at times be attributable to it being difficult for keywords to capture and understand complex search semantics that a user seeks to express in the query. Rather, keyword-based search can often interpret the user query without ascribing any meaning to the form and expression entered by the user.

To address this problem with keyword searching, some systems utilize techniques beyond keywords. For example, such systems can capture and understand more complex search semantics the user seeks to express. To that end, these systems can attempt to characterize the user's query in terms of predefined frequently asked questions (FAQs), which can be manually indexed from user logs along with corresponding answers. One key characteristic of FAQ searches is that they take advantage of the fact that commonly asked questions are much fewer than total number of questions. By referencing logs of questions that were previously asked by users, FAQ-based search engines can compute which questions are most commonly asked. Further, with FAQ-based search engines, a level of indirection is added by asking the user to confirm one or more rephrased questions in order to find an answer.

Unfortunately, however, FAQ-based search engines can also be limited in their understanding the user's query because the FAQ-based searches might only look up frequently occurring words in the query, and might not perform any deeper syntactic or semantic analysis. While FAQ-based searches have improved search precision to some extent, there may still remain a need for further improvement in processing user queries.

One way of defining semantic intent within a user query—so that the query's words are more meaningful and capture the relationship between the natural language words and phrases within the query—can be to use a parser to parse the query. For example, the parser can determine the structure of the query, determine relationships between words, phrases, and/or characters in the query, and build a representation of the syntax of the query that a computing device can understand. To facilitate this, a parser can apply context-free grammars to the query. Some such grammars can be written using Backus normal form (BNF—also known as Backus-Naur form), which is a notation technique (also referred to as a "metalanguage") that can be used to formally define the grammars so that they are ideally unambiguous during parsing of the query as to which portions of the query should undergo further processing and which portions of the user query should be rejected, ignored, etc. Such grammars will be referred to herein as BNF grammars.

A BNF grammar can be made up of a set of grammar rules (also referred to as "rules," for short, or "productions"). Rules can be written in accordance with a particular meta-syntax, which describes the allowable structure and composition of phrases and sentences written in BNF. The meta-syntax for BNF can include "terminal symbols" (or "terminals," for short) and "non-terminal symbols" (or "non-terminals," for short). Terminals can include characters, strings, and/or digits that are non-ambiguously defined and to which no rules are applied. Non-terminals, on the other hand, are more like variables in the sense that a given non-terminal is defined in terms of terminals, the non-terminal itself (e.g., in recursive situations), and/or other non-terminals. In other words, for a rule that provides a definition for a non-terminal, other rules must be sought in order to determine a definition of the non-terminal.

As such, each BNF grammar rule can have a left-hand side and a right-hand side. The left-hand side can include a non-terminal. The right-hand side can be an expression that provides the non-terminal's definition in terms of terminals, the non-terminal itself, and/or other non-terminals.

Consider, for example, an example BNF grammar, made up of the following two rules:
  INTEGER::=DIGIT|INTEGER DIGIT
  DIGIT::=0|1|2|3|4|5|6|7|8|9

In this and other examples herein, non-terminals will be denoted either by being written in all capital letters or surrounded by angled brackets, the definitional operator "::=" will be used to separate a non-terminal from the non-terminal's definition, and the operator "|" (which provides a logical OR) will be used in definitions where appropriate. It should be understood, however, that rules can be written in other manners as well. For example, non-terminals could appear in bold text, and the definitional operator ":" could be used instead of "::=".

Here is an example of how the two rules noted above can be expressed in plain English when read left to right:
  An INTEGER is comprised of (or "defined as") a DIGIT, or an INTEGER and (or "followed by") a DIGIT.
  A DIGIT is comprised of a 0, 1, 2, 3, 4, 5, 6, 7, 8, or 9.

Using this BNF grammar, consider a situation in which the string 312 appears in a query. The parser may determine which rule(s) to apply to the string, and in doing so, can attempt to determine whether 312 is a DIGIT or an INTEGER and a DIGIT. Because 312 is not a DIGIT, it might be an INTEGER followed by a DIGIT, in which case the INTEGER is 31 and the DIGIT is 2. Further, because 31 is not a DIGIT, it too might be an INTEGER followed by a DIGIT, in which case the INTEGER is 3 and the DIGIT is 1. Finally, the INTEGER, 3, is a DIGIT. The preceding parsing of the string, 312, thus produces the parse tree illustrated in FIG. 7A. Once this information is obtained, the information can then be passed to another routine or computing device for further processing.

Figure 7A:
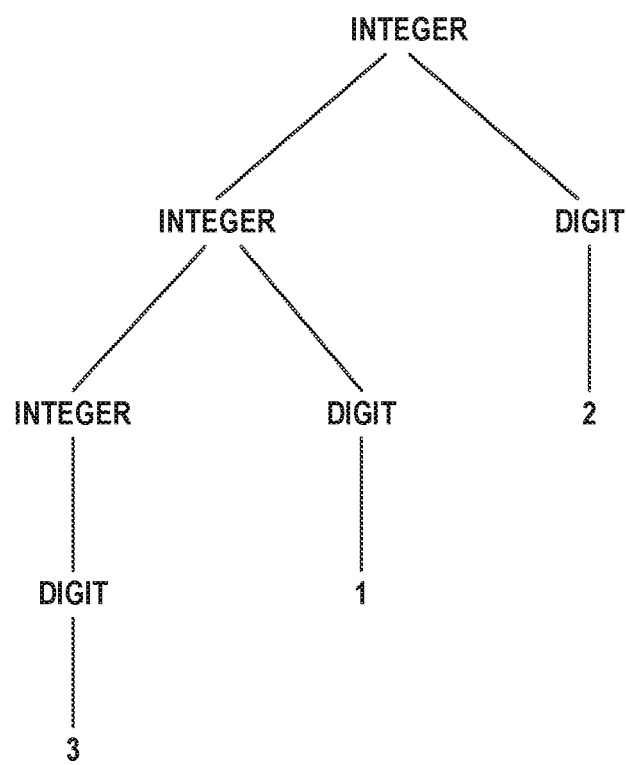
FIG. 7A is a parse tree produced using a grammar, in accordance with example embodiments.
Figure 7B:
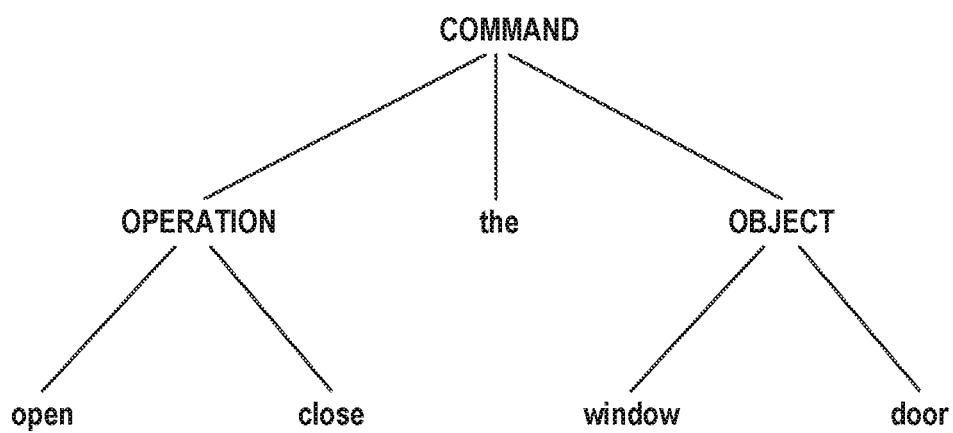
FIG. 7B is another parse tree produced using a grammar, in accordance with example embodiments.

FIG. 7B is another example parse tree produced in accordance with the following example BNF grammar:
COMMAND::=OPERATION the OBJECT
OPERATION::=open|close
OBJECT::=window|door In this example, the rules contain definitions for three non-terminals, namely, OBJECT, OPERATION, and COMMAND. According to this BNF grammar, there are two possible objects ("window" and "door"), two possible operations ("open" and "close"), and thus four possible commands ("open the window", "close the window", "open the door", and "close the door"). Therefore, when a computing device receives the phrase, "open the window," in a query, the computing device can interpret the word "open" to be an OPERATION and can interpret the word "window" to be an OBJECT. The phrase then becomes "OPERATION the OBJECT", which the rules define as a COMMAND. Thus, using the BNF grammar, the computing device can determine that the phrase "open the window" is a COMMAND, where the OPERATION="open" and the OBJECT="window." Once this information is obtained, the information can then be passed to another routine or computing device for further processing. Other example BNF grammars and parse trees are possible as well.

Unfortunately, there are some disadvantages of using BNF grammars to parse queries. While BNF grammars can provide translations for user queries that are meaningful and reflect the relationships between the elements of such queries, BNF grammars can be difficult to enhance, such as with the addition of new BNF rules. While the majority of BNF grammars might not change frequently, some rules and the terminals desirable for inclusion in a grammar often change over time. For example, words, phrases, or rules can change based on new user data, query logs, and the like. In these and other scenarios, however, a BNF grammar might not provide a mechanism to update and change its words, phrases, and rules without an administrator having to structurally modify the BNF definition itself—namely, a modification to the BNF grammar.

Regardless of which type of formal grammars are used when parsing a query, a structure of a sentence in a query can affect how the parser interprets the relationship between words in the sentence. For example, with sentences having a simple structure, such as "The dog likes treats," traditional algorithms can correctly interpret the relationship between the words because there are not multiple combinations of words to parse. However, with more complex sentence structures, traditional algorithms can provide multiple combinations of words, thus making it more difficult to determine the most likely combination.

VII. Example Natural Language Query Parsing and Processing

In accordance with example embodiments, and as described by way of example above, a remote network management platform may include or contain a computational instance (also referred to as a "customer instance") that is associated with a managed network. The managed network could, for example, support the mission and operations of an enterprise. The computational instance may include one or more databases configured for managing data relating to and/or supporting various aspects of remote management of the managed network.

In a network managed by a remote network management platform, particularly large-scale managed networks with hundreds or thousands of users and computing devices and thus large amounts of data (e.g., terabytes), databases are frequently searched by a variety of users to obtain desired data. For example, there may be hundreds or thousands of searches per day across the managed network. In addition, the type of data searched, the amount of data searched, the manner in which the data is organized and stored, and the manner in which users attempt to search for data can vary per user, per department, per application or service being used for searching, or otherwise vary across the managed network and can also change over time. For example, users in an IT department of the enterprise might perform complex searches in attempting to resolve incident requests submitted for other users. As another example, software asset management administrators might perform complex searches in attempting to gather and concisely organize license information so that accurate determinations of compliance can be made. Other examples are possible as well. In practice, a database search typically begins with a user query, followed by parsing and processing the user query in order to form or generate a formal database query that may be input to a database, and, ultimately (or at least eventually) leading to one or more formal query results that are returned to the user.

At a high level, parsing and processing of a user query based on a context-free grammar such as BNF may be described as a process by which a sequence of words that makes up the query is analyzed according to one or more applicable BNF rules in order to construct a parse tree, as described by way of example above in connection with FIGS. 7A and 7B. Individual words or text (or character) items of the user query may form the leaf nodes of the tree (generally mapping to terminals of the grammar), and branches leading to the root node traverse intermediate nodes (generally mapping to non-terminals of the grammar). By analyzing the rules traversed in the parse tree, the meaning of the query as entered by the user can be mapped to formal query terms and syntax, in order to translate the user's query into a formal language of a formal database query. One of the challenges of this approach is that, even when a user forms a query that is knowingly targeted to a specific and relatively bounded realm of relevant data and selection criteria (e.g., data related to an enterprise associated with a managed network), the user's natural language with which the query is expressed may still exceed the boundaries of the BNF rules in terms of vocabulary and syntax, for example. As a result, user queries entered or provided in natural language may not be able to be parsed in compliance with the BNF rules, and thus may fail to map to a formal database query. As data searches within the managed network increase in number and/or otherwise change in complexity or frequency, it can be increasingly difficult for the remote network management platform to provide services that efficiently and consistently parse user queries and obtain desired results.

Accordingly, disclosed herein is a remote network management platform that implements techniques for parsing queries that users may enter or provide in their natural language. In particular, a software application executable on one or more computing devices of the remote network management platform can be configured to extend BNF grammar rules in order to more efficiently represent and/or accommodate natural languages and allow BNF grammar words and/or phrases to be added seamlessly without having to structurally and/or functionally modify the BNF rules themselves. The one or more computing devices may be part of, or included in, a computational instance associated with a particular managed network, and/or may be more broadly part of the remote network management platform and operational in the service of more than one computational instance of the remote network management platform. Other configurations of the one or more computing devices may be possible as well.

In accordance with example embodiments, extensions to BNF grammar rules (or to other context-free grammars) make take the form of metadata (e.g., metadata-referencing non-terminals) that represents the schema of a database in a textual form that may be interpreted within the framework of user query parsing according to the BNF rules. Advantageously, the metadata may be created or generated by translating identities, specifications, and/or definitions of database tables, columns, rows, entries, etc., as well as parametrized relations between them into text. The text may be interpreted as conditions and/or search criteria in the context of a formal database query language. The metadata may also be indirectly "embedded" in the BNF grammar rules in such a manner (e.g., via pointers or links to one or more metadata files) that enables expansion of the applicable scope of the BNF grammar rules, without changing or modifying the grammar rules themselves or by making relatively minor modifications thereto.

Further, the metadata may also include a flexible scheme for translating and/or mapping a wide and evolving array of natural language words and/or expressions to formal database query terminology through the parsing process. More specifically, example embodiments provide expansion of metadata that may represent formal database query input data in abbreviated forms referred to herein as "synonyms" and "semantic shortcuts." Briefly, in the context of metadata, a synonym is a natural language word or phrase that may be used in equivalence to a formal term of a context-free grammar rule, which may be mapped by parsing to input of a formal database query. Similarly, a semantic shortcut is a natural language word or phrase that may be used in equivalence to a formal condition or criterion of a context-free grammar rule, which also may be mapped by parsing into of a formal database query. During parsing, synonyms and/or semantic shortcuts encountered in a user query may be replaced by their known equivalents, thereby rendering the user query compliant with applicable BNF rules, and enabling proper parsing.

In example embodiments described herein, metadata is thus used to extent BNF grammar rules in two ways. One way is to express a database schema, including tables, rows, and columns, in textual form and with one or more possible variants. This enables the BNF rules to reference the database schema indirectly, without having to "hardwire" the schema into the BNF rules. The other way is to accommodate a broad range users' natural language(s) in the BNF rules, thereby relaxing constraints on users' query vocabularies that might otherwise require a high degree of database expertise on the part of users. In particular, the implementation of synonyms and sematic shortcuts may be considered as enabling "natural language queries" or "NLQs."

A further advantage of using metadata to extend context-free grammars for query parsing and processing is that it enables rapid expansion and/or adaptation that may be customized or tailored to specific environments. For example, when applied to database schema, new and/or modified tables may be accommodated by updating metadata, without having to change BNF rules. When applied to synonyms and/or semantic shortcuts, new abbreviations can similarly be added or revised without changing BNF rules. This may allow the same BNF rules to be applied to different geographic regions of an enterprise, where local natural language customs may be used. Even different working groups within an enterprise may employ different terminology to mean the same thing at the formal query level.

As an example, an NLQ might be entered by a user as "show recent open p1 incidents." In parsing this NLQ, the term "p1" may be interpreted as a semantic shortcut, and replaced by an equivalent phrase "urgency=1" from a metadata file containing semantic shortcuts. Similarly, the phrase "recent incidents" may be interpreted as a semantic shortcut, and replaced by an equivalent phrase "sort by opened_at descending" from a metadata file containing semantic shortcuts. These are just two illustrative examples. Examples of how NLQs can be interpreted as database search queries are further illustrated below.

Figure 8:
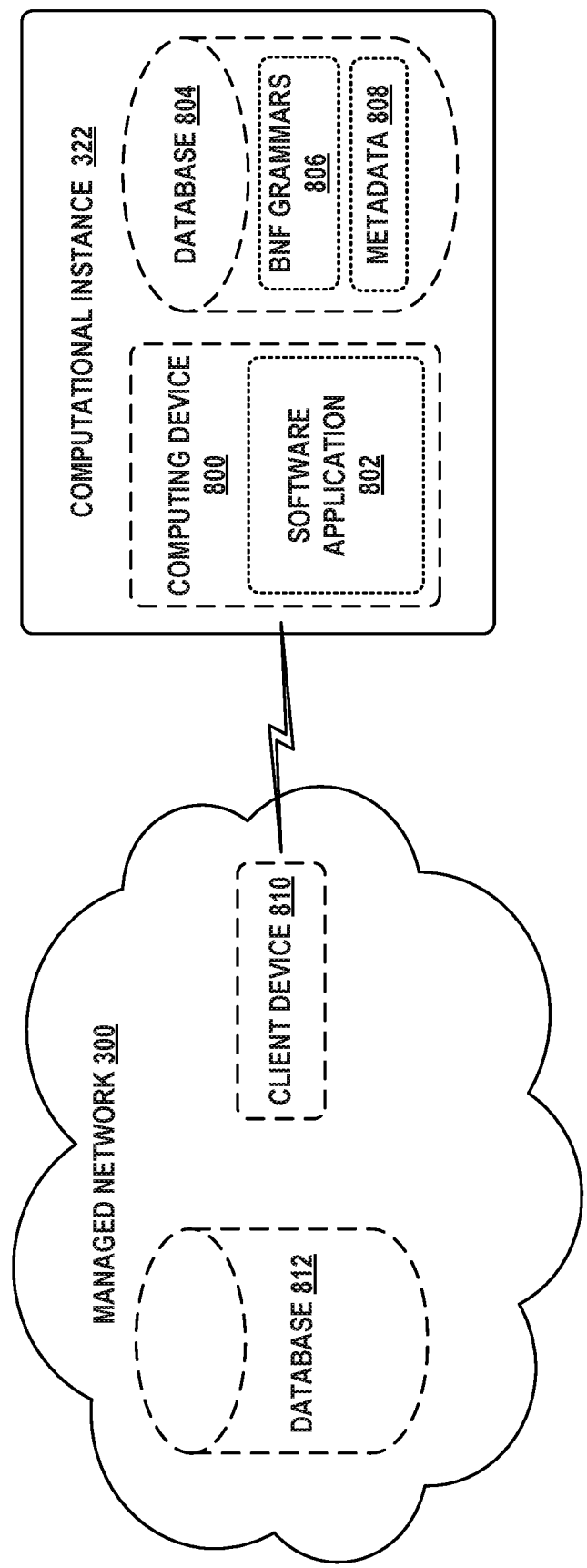
FIG. 8 depicts a communication environment in which a software application can receive and process natural language queries, in accordance with example embodiments.

FIG. 8 depicts an example communication environment in which a software application can receive and process NLQs in order to provide search results to client devices of managed network 300. As shown, computational instance 322 (of remote network management platform 320) can include a computing device 800 on which software application 802 is executable. Software application 802 can include or remotely call one or more parsing modules (hereinafter referred to as "parsers") configured to parse queries using BNF grammars or other types of grammars.

Computational instance 322 can also include a database 804, which can store BNF grammars 806 (including improved extensions thereof) and metadata 808. Database 804 can be a local database of computing device 800 or a database contained at a different computing device of computational instance 322.

BNF grammars 806 can include at least one set of rules, some of which might correspond to a distinct human language and/or a distinct regional dialect thereof. BNF grammars 806 can be downloaded and updated over the Internet or entered and updated by an administrator or other user of managed network 300 or remote network management platform 320.

Metadata 808 can be in various forms, such as XML, HTML, or JavaScript Object Notation (JSON). As will also be discussed in more detail below, software application 802, or a parser thereof, can include a module configured to load, examine, and utilize metadata 808 that is in XML, HTML, JSON, and/or one or more other forms.

Database 804 can be CMDB 500 or a separate database. Database 804 can also store a variety of other searchable data associated with managed network 300, such as incident reports and identifiers of users of managed network 300, among many other possibilities.

As further shown, computing device 800 can be in communication with a representative client device 810 of managed network 300. Managed network 300 can also include its own database 812, which can store the same metadata 808 as database 804, or a portion thereof. Like database 804, database 812 can also store a variety of other searchable data associated with managed network 300, such as incident reports and identifiers of users of managed network 300, among many other possibilities.

Using client device 810, a user can access software application 802, which can provide client device 810 with an interface (e.g., a graphical user interface or an API) that enables the user to enter a NLQ, transmit the query to computing device 800, receive search results associated with the query from computing device 800, and view the search results.

When a user inputs a query or a portion thereof via client device 810, client device 810 can transmit the query to computing device 800, which can trigger computing device 800 to perform various actions. As an example, such actions can include, for example, (i) retrieving BNF grammars 806 to be used in parsing the query, (ii) parsing the query by applying BNF grammars 806 to the query, (iii) generating a "query object" based on the parsing, where the query object is in a form associated with a specific search format for a particular database, databases, or the Internet, such as SQL or XML, (iv) searching database 804, database 812, another database, or the Internet using the query object as a formal search query (the formal search query being a different from the NLQ), and (v) transmitting, to client device 810, a result of the search query. Note that the term "query object" for a formal query in a formal database query language is used to capture the complex formal structure that is typical of a formal query language, such as multiple fields and/or nested structures.

In accordance with example embodiments, computing device 800 can analyze the received query before parsing the query (or passing the receive query to a parsing application). Such initial analysis may be considered "pre-processing." In practice, an NLQ may be received in the form a text string. Pre-processing may then entail identifying individual words, possibly providing the user with suggested corrections for apparent typographical errors, and preparing the string for parsing.

The computing device may then access or retrieve BNF grammar examples described above and as well as metadata. By applying BNF grammars 806, together with the metadata, to the query, computing device 800 can parse the query into a parse tree that can have one or more paths, each path corresponding to a respectively different interpretation of the query that can be used to generate a respective query object to be used to perform the search.

In accordance with example embodiments, various approaches may be used in parsing to determine the best or most likely parse tree and interpretation. By way of example, computing device 800 can apply a "left-to-right greedy matching" technique. As an example of how this technique is performed, consider again the following example BNF grammar.

QUERY::=LEFT MIDDLE RIGHT
LEFT::=this|this is
MIDDLE::=is a|a simple
RIGHT::=simple test|test In this example, the rules for non-terminals LEFT, MIDDLE, and RIGHT each have two definitions. For example, LEFT has a definition of "this is" or "this," MIDDLE has a definition of "is a" or "a simple," and RIGHT has a definition of "simple test" or "test." Thus, a first path in the parse tree can include LEFT="this is," MIDDLE="a simple," and RIGHT="test," and a second path in the parse tree can include LEFT="this," MIDDLE="is a," and RIGHT="simple test."

As a general matter, given a non-terminal having multiple different definitions in its expression, the concept of left-to-right greedy matching involves prioritizing the leftmost definition for the non-terminal. For example, for LEFT, the leftmost definition is "this," and thus, "this" would be prioritized over the next leftmost definition, "this is." Thus, "this" would be selected as the definition for LEFT over "this is," and, in turn, it follows that MIDDLE would match with "a simple" and RIGHT would match with "test." As such, the designer of this BNF grammar or a user thereof can count on this particular interpretation of the query being matched. Computing device 800 can then generate a query object based on this matching of the query and perform a search (e.g., of one or more of database 804 or database 812, or the Internet) using the query object as a search query.

As noted above, computing device 800 can be configured to implement improved, extended BNF grammar rules that more efficiently represent natural languages and allow BNF grammar words, phrases, and rules to be added seamlessly without having to structurally modify the BNF itself.

To facilitate this, BNF grammars 806 can include a set of extended BNF grammar rules that can be stored externally from the parser itself, separately from other BNF grammars, so that the set of extended BNF rules can be dynamically loaded by the parser without changing the BNF itself. In some implementations, the set of extended BNF rules can be a global set of extended BNF rules that can be downloaded or otherwise accessible to and used by various managed networks. Alternatively, the set of extended BNF rules can be specifically tailored to an entity associated with a particular managed network (e.g., managed network 300). When computing device 800 parses a received query, computing device 800 can retrieve the set of extended BNF rules (e.g., from database 804) along with, or separate from, other BNF grammars that can be used to parse the query.

In some implementations, one or more rules of the set of extended BNF rules can include a regular expression. Such rules can thus allow more seamless joining of complete words and regular expressions. For example, a rule can define a date as having the following format.

DATE_YYYY_MMDD::=\d\d\d\d[-]\d\d[-]\d\d

This example rule includes a variety of occurrences of a wildcard character, \d. A wildcard character can serve as a placeholder that can be interpreted as a number of literal characters or an empty string. In particular, in this example, \d can designate, and thus can be replaced by, any digit from 0 to 9. As such, when the query includes a date written in a 4-digit year, 2-digit month, and 2-digit day format, the wildcard characters allow the parser to correctly identify the date.

As another example, a rule can define a five and nine digits zip code as having the following format, where \d can designate a digit.

ZIP_CODE::=\d\d\d\d\d|\d\d\d\d\d[-]\d\d\d\d

In other examples, a regular expression could include other wildcard characters as well, such as \u to designate an upper-case letter, \l to designate a lower-case letter, \p to designate a punctuation mark, an underscore,_, to designate any single word, an asterisk, *, to designate any single character and/or one or more repetitions of an expression, and/or \nd to designate any number, n, of digits, among other possibilities.

As a more particular example, the following rules can define a full name as either having a first name and a last name or a first name, middle initial, and last name, where (i) a first name is of the following form: one upper case letter and either one or more lower case letters or one period "."; (ii) a middle initial is of the following form: one upper case letter and one period; and (iii) a last name is of the following form: one upper case letter and one or more lower case letters.

FULL_NAME::=FIRST_NAME LAST_NAME|FIRST_NAME MID_IN LAST_NAME
FIRST_NAME::=\u((\l)*|.)
MID_IN::=\u.
LAST_NAME::=\u(\l)*

Other wildcard characters are possible as well, as well as variations on those discussed above.

By implementing regular expressions in extended BNF rules, the parser can more efficiently parse and match certain words or other strings, such as dates, names, and zip codes, among many other examples. Without such extended BNF rules, more rules might be required to parse and match such words and/or strings. For example, regular expressions in a BNF rule to match any three-digit number followed by a lowercase letter can take the following form:

THREE_DIGITS_AND_LETTER::=\d\d\d\l

In comparison, BNF rules without regular expressions to match any three-digit number followed by a lowercase letter can take the following form:

THREE_DIGITS::=DIGIT DIGIT DIGIT LOWER_CASE
DIGIT::=0|1|2|3|4|5|6|7|8|9
LOWER_CASE::=a|b|c|d|e|f|g|h|i|j|k|l|m-|n|o|p|q|r|s|t|u|v|w|x|y|z

In some implementations, one or more rules of the set of extended BNF rules can include a Boolean expression having at least one operator other than an OR operator, such as a NOT operator, an AND operator, or both a NOT operator and an OR operator.

An extended BNF rule including an AND operator can be useful, for example, in situations in which it might not be desirable for at least a portion of the query to be interpreted on a term by term basis. As an example, the parser might be configured by default to interpret the query "New York meetup" on a term by term basis, and thus might not be able to identify two different interpretations of "New York". Rather, "New York" might be interpreted as two separate terms, "New" and "York". Thus, an extended BNF rule having an AND operator can allow for seamless joining of complete words, such as "New York", when desired. Consider the following example extended BNF rules, which use an AND operator, &, as well as underscores as wildcard characters.

CITY::=san francisco|new york|seattle
ONE_TERM_CITY::=CITY & (_)
TWO_TERMS_CITY::=CITY & (_ _)

In this set of rules, the single underscore character in the parenthesis in the ONE_TERM_CITY rule can be used to match queries with one-word cities, such as Seattle. Whereas, the double underscore characters, separated by a space, in the parenthesis in the TWO_TERMS_CITY rule can be used to match queries with two-word cities, such San Francisco or New York. Other examples are possible as well.

Furthermore, an extended BNF rule including a NOT operator can be useful in certain situations, such as when words have multiple meanings. In these and other situations, the NOT operator can be used to prevent certain terms from being interpreted in ways that might be undesirable in certain contexts. For example, the word "nice" can be interpreted as a city (namely, the city of Nice, France) or as a descriptive word. Thus, for the example query, "Milan is nice," the term nice can be interpreted as the city or a descriptive word describing the city of Milan. To assist with a desired interpretation of the query, an extended BNF rule can include a NOT operator. For example, consider the following seven rules, the last of which including a NOT operator, ~.

EURO_CITY::=milan|venice|nice
US_CITY::=san francisco|new york|seattle
VERB::=is|was
STOP_WORDS::=beautiful|wonderful|EURO_AMBIGUOUS
EURO_AMBIGUOUS::=nice
US_CITY_DESCRIPTION::=US_CITY VERB STOP_WORDS
EURO_CITY_DESCRIPTION::=EURO_CITY VERB (STOP_WORDS & EURO_AMBIGUOUS)

In effect, the rules in this example can match the query in different ways, depending on whether the city in the query is a U.S. city or a European city. More particularly, using these rules, the parser can match queries that have the descriptive word "nice" being used to describe a U.S. city, but might not match queries that use the word "nice" to describe a European city, due to the possible confusion with the European city of Nice, France. Other examples are possible as well. By preventing the parser from interpreting terms in undesired manners, the efficiency of parsing, and thus the search as a whole, can be improved.

In accordance with example embodiments, once computing device 800 has parsed the query using the set of extended BNF rules, computing device 800 can generate a query object (e.g., in SQL form), search database 804, database 812, another database, or the Internet using the query object as a search query, and transmit a result to client device 810.

In practice, parsing of complex NLQs may be computationally expensive. Further, in the context of a large network and/or enterprise, the number of NLQs needing parsing may be large. In accordance with example embodiments, the processing described in connection with the example system shown in FIG. 8—namely that done by the computing device 800—may be divided between a computing device in a computational instance and a separate server device in the remote network management platform.

Figure 9:
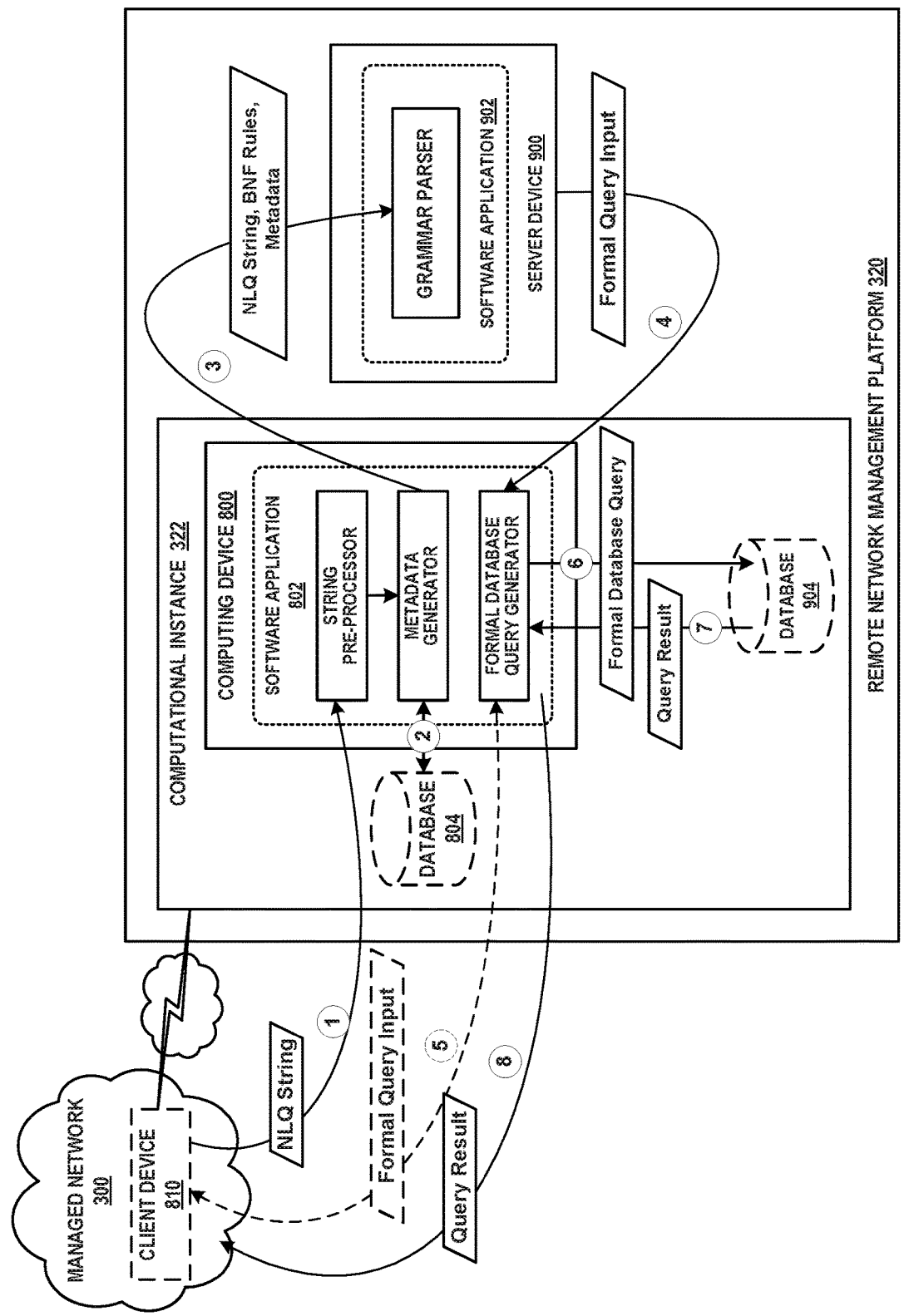
FIG. 9 depicts an architecture for a natural query language processing system and showing example operation, in accordance with example embodiments.

FIG. 9 depicts an example architecture for an NLQ processing system in which the computational burden of actual parsing may be removed from the computational instance and taken on by a server device of the remote network management platform. The format of FIG. 9 displays example operational flow as well. In particular, FIG. 9 depicts an implementation in which an NLQ is received and pre-processed by computing device 800 of the computational instance 322. The computing device 800 also obtains or generates metadata, which may be thereafter cached for future NLQs. However, in the example illustrated in FIG. 9, parsing is carried out by as separate server device in the remote network management platform 320.

In addition to the remote network management platform, FIG. 9 also depicts a managed network 320 that includes client device 810. For the sake of brevity in the figure, other elements of the managed network 320 have been omitted. For purposes of illustration, the computational instance 322 includes two databases: database 804 and database 904, in addition to the computing device 800. Each database may contain data for different aspects of NLQ parsing and processing. Specifically, and by way of example, the database 904 may include management data that are subject to search and analysis, as specified or requested in user NLQs for example. These are the data that users may be interested in examining and/or analyzing. The database 804 my include data used by the NLQ parsing operations, such as metadata describing the schema of the database 904, and/or metadata that records synonyms and sematic shortcuts. It will be appreciated that the separation in FIG. 9 of the two types of data into distinct database is meant to highlight the different types and roles of the data. In other implementations, both types of data could be stored and managed in the same physical database.

In accordance with example embodiments, the computational instance 322 of the remote network management platform 320 may implement a software application 802, and the server device 900 of the remote network management platform 320 may implement a software application 902. Each of these software applications may include functional modules or components that are configured to carry out different aspects of NLQ parsing and processing. Specifically, the software application 802 is shown to include a string pre-processor, a metadata generator, and a formal database query generator. The software application 902 is shown to include a grammar parser. Each of the functional components or modules may be implemented as executable instructions stored in one or another form of memory (e.g., non-transient computer-readable media). When the instructions are executed by one or more processors of the computing device 800 and/or the server device 900, the computing device and/or server device may then carry out operations of the functional components or modules.

Operation of NLQ processing may be described by way of example, as illustrated in FIG. 9 by enumerated arrows indicating example actions and information flow. The example operational actions and flow illustrated is not intended to be limiting, but rather represents one descriptive scenario of NLQ parsing and processing in accordance with embodiments herein.

Operation may begin with an NLQ string entered at client device and transmitted to the computing device 800, as indicated by the arrow labeled "1." In the example illustrated, the NLQ string may be entered as text by way of a keyboard device, for example. In this scenario, the query may be entered as a text string. In another example, the query may be a spoken utterance that is converted to text by a speech-to-text application on the client device or some other audio input device communicatively connected to the client device. In either scenario, a query text string corresponding to the user query may be transmitted to the computing device 800.

As shown, the NLQ string may be received by the string pre-processor module, where various aspects of string pre-processing may be carried out. As indicate above, these may include determining individual words and/or phrases of the NLQ string, correcting evident typographical errors, and classifying the NLQ according to recognized terms, for example. In addition, pre-processing of the NLQ string may be used to evaluate one or more BNF rules applicable to the query. This may involve recognizing terms corresponding to tables, columns, filters, and other possible schema components.

Next, the metadata generator module may access the database 804 to retrieve one or more BNF rules applicable to the NLQ, and also to retrieve metadata associated with the retrieved BNF rules, as indicated by the arrow labeled "2." This operation may include retrieval of metadata descriptive of a schema or schemas of the management data in the database 904. In accordance with example embodiments, BNF rules may be generated upon an initial NLQ string that references particular tables, rows of columns of the database 904. Thereafter, the BNF rules may be cached for expedited access and retrieval for future NLQ strings relating to the schema. As indicated, the metadata descriptive of the schema may be stored in one or more JSON-formatted files. Similarly, metadata for synonyms and/or semantic shortcuts may be retrieved and/or generated by the metadata generator.

Once the BNF rules and metadata are retrieved and/or generated, the NLQ string, BNF rules, and the metadata may be forwarded or transmitted to the software application 902 implemented in the server device 900, as indicated by the arrow labeled "3." The grammar parser may then parse the NLQ string, together with the metadata, according to the one or more BNF rules to build a parse tree. As indicated above, this can be a computationally expensive operation, particularly for complex queries that may occur in very large numbers in a large managed network. In accordance with example embodiments, the server device 900 may be dedicated or at least partly dedicated to parsing operations, so that, advantageously, significant computing power and resources may be applied to parsing without imposing undue or excessive computing and/or resource demands on the computing device 800 or more generally on the computational instance 322.

In accordance with example embodiments, the grammar parser may parse the NLQ string according to the BNF rules, using the metadata to substitute rule-compliant terms (e.g., metadata-referencing non-terminals) encountered in the BNF rules during parsing. More particularly, when a metadata term signaling a synonym is encountered, the metadata file containing synonyms may be consulted to match a term in the NLQ with a synonym, and the formal BNF term associated with the match synonym may be substituted into the BNF rule, thereby enabling proper parsing. Similarly, when a metadata term signaling a semantic shortcut is encountered, the metadata file containing sematic shortcuts may be consulted to match a term in the NLQ with a sematic shortcut in the file, and the formal BNF expression associated with the match sematic shortcut may be substituted into the BNF rule, thereby enabling proper parsing.

The parsing operation may generate parse tree, as described above. The parse tree may then be analyzed to map the NLQ to formal query input that may be used to construct or generate a formal database query. The formal query input may then be returned to the formal database query generator module of the software application 902, as indicated by the arrow labeled "4."

Before generating a formal query, the user may be presented with the formal query input as an optional step, as indicated by the dashed arrow labeled "5." The data may be presented to the user in a user-friendly form that allows the user to check if the user's request, as entered in the NLQ, has been understood by the system. If not, the user may re-enter or revise the NLQ with more precise terms, perhaps using the feedback as guidance. Although not necessarily shown, the process may repeat iteratively until the user is satisfied that the system correctly understands the request. In practice, this may typically take only one or two additional iterations if the first pass parsing failed to yield a proper understand the user's intended query.

Assuming the parsing yields the correct formal query input, either on the first try or a subsequent iteration, the formal database query generator module may then generate or construct a formal database query, also referred to herein as a "query object." As noted above, this term, in particular "object," captures the complex formal structure that is typical of a formal query language, such as multiple fields and/or nested structures. The formal query (e.g., a database language query such as an SQL query) may then be submitted to the database 904, as indicated by the arrow labeled "6."

The formal query result is returned from the database 904 to the formal database query generator, as indicated by the arrow labeled "7." The query result is then transmitted to the client device, as indicated by the arrow labeled "8." The result may first be processed for presentation in a user-friendly form, such as in graphical display. The user may then view and/or analyze the returned data.

Figure 10:
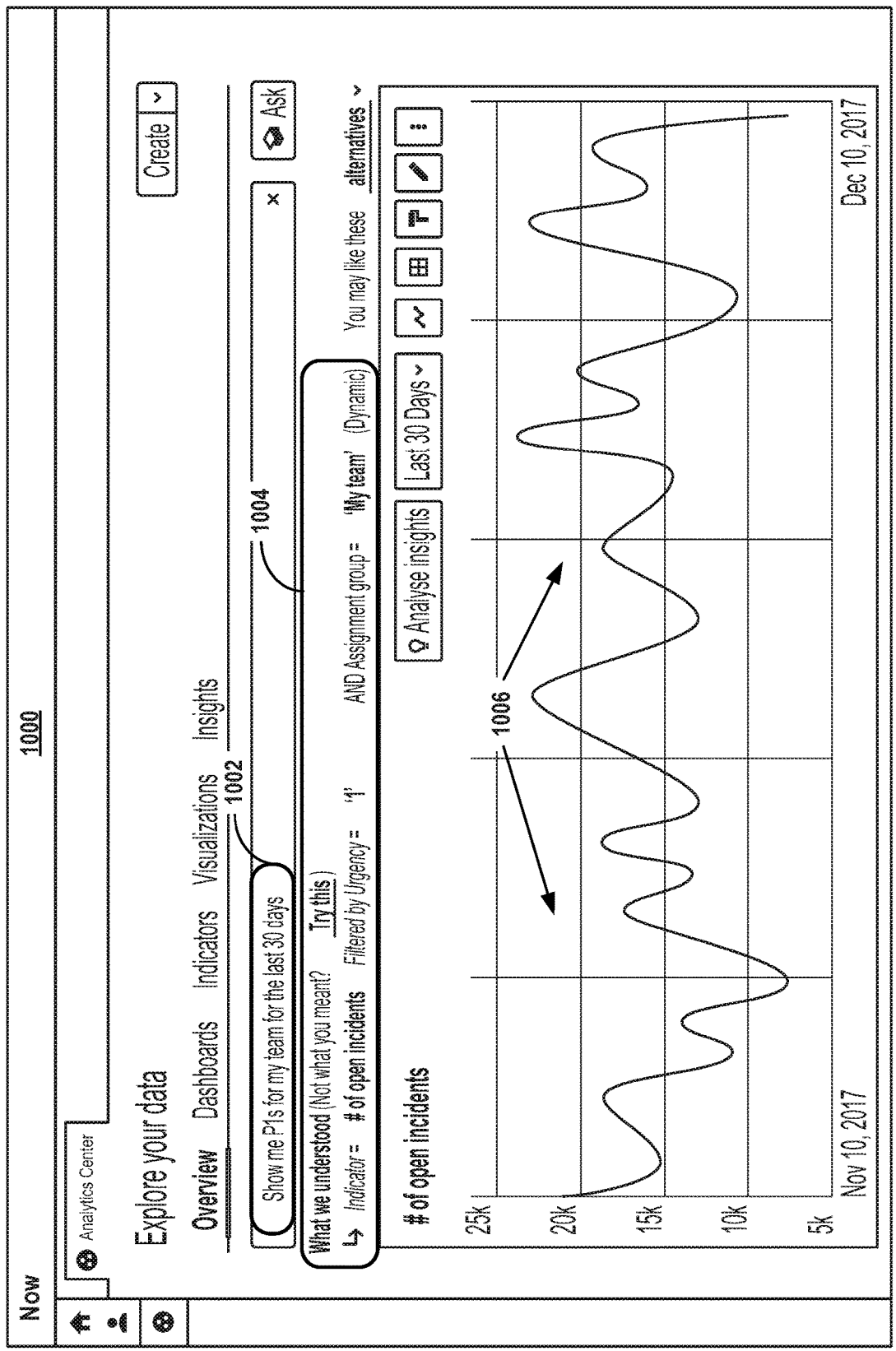
FIG. 10 depicts an example graphical user interface (GUI) including an example natural query language, query suggestions, and query results, in accordance with example embodiments.

FIG. 10 depicts an example GUI 1000 that includes NLQ 1002 from a user and query suggestion 1004 that computing device 800 can generate and provide for display at client device 810. As represented in this illustration, a user may enter a NLQ string at the client device 810 as "Show me P1s for my team for the last 30 days." Upon parsing this NLQ, as described above, a suggestion of what the grammar parser understood the NLQ to mean is displayed as "What we understood . . . " and presents formal query terms "# of open incidents filtered by urgency '1' AND Assignment group='My team'." In this example, it is assumed that the user deems this interpretation to be correct, so a formal database language query is generated and the result returned and displayed in the graphical form 1006 as shown.

The illustration of FIG. 10 also indicates how synonyms and sematic shortcuts may be applied. For example, the term "p1" may be used as a sematic shortcut for the phrase "urgency=1" As such, a user does not need to know or be required to enter the formal phrase, but rather may use the more informal term "p1." During parsing, the grammar parser module may encounter a non-terminal in a BNF rule with a reference to metadata in which "p1" is defined to be "urgency=1". Thus, "p1" may be replaced with "urgency=1", which enables proper parsing and proper generation of a formal database language query.

The use of synonyms and sematic shortcuts thus enables a user to enter NLQs that may be properly interpreted during parsing in accordance with BNF rules and mapped to database language queries.

VIII. Example Query Expression Grammar

FIG. 11A depicts an example query expression grammar 1100 in accordance with the embodiments herein. Grammar 1100 can be interpreted as described above—each rule has a non-terminal on its left hand side and one or more non-terminals and/or terminals on its right hand side. Non-terminals are expressed in capital letters while terminals are expressed in lower case letters. Further, a right hand side of a rule may use logical and other operators to specify combinations of non-terminals and/or terminals. The designation "::=" separates the left hand sides from the right hand sides of rules.

Special characters or combinations thereof may provide additional functionality. For example, a "?" following a term means greedy optionality, where the parser will match the term if possible, otherwise the parser will skip the term. On the other hand, a "??" means non-greedy optionality, where the term is skipped if possible, otherwise matched. Lists are presented as a chain of optional items (e.g., items followed by a "?"). Such a list is generally matched from first to last; that is, if several options can be matched, the first such option will be selected.

Regular expressions can be defined between forward slashes. In these expressions, terms can be enclosed in brackets, a "\d" matches any digit, a "." matches any single character, a "?" means the previous term is optional, a "+" means that there must be one or more of the previous term, and a "*" means that there can be zero or more of the previous term. Thus, the rule "NUM@::=/[−+]?\$?\d+[\d,\.]*/" specifies that the non-terminal NUM matches any positive or negative integer or floating point number.

Further, a "& ~" specifies a Boolean "AND NOT" operation. For example, the rule "WORD::=/.+/ & ~KEYWORD" means that the non-terminal "WORD" matches any text except for what the non-terminal "KEYWORD" matches.

Terms with the "METADATA_" prefix are references to metadata associated with database tables and columns thereof. These may be referred to as "metadata-referencing non-terminals." As noted above, this metadata may be stored in a database or a separate file. The "METADATA_ENTITY" non-terminal generally refers to a database table, the "METADATA_STRING" non-terminal generally refers to a column of a database table containing text string data, the "METADATA_BOOL" non-terminal generally refers to a column of a database table containing Boolean data, the "METADATA_DATE" non-terminal generally refers to a column of a database table containing date and time data, the "METADATA_NUM" non-terminal generally refers to a column of a database table containing numerical (e.g., integer or floating point) data, and the "METADATA_VALUE" non-terminal generally refers to a value appearing in a column of a database table.

FIG. 11B depicts example metadata 1110 for table 600. Metadata 1110 consists of an array of compound elements, each defining a mapping between the name of table 600 and one or more synonyms, a mapping between the name of a column in table 600 and one or more synonyms, or a mapping between values appearing in a column in table 600 and one or more synonyms. These synonyms may include alternative terms for the table, the columns, and/or the values therein.

For example, compound element 1112 defines a mapping between the name of table 600 ("incident") and the alternative terms "incident" and "ticket". This means that the alternative terms "incident" and "ticket" can be used in an NLQ expression to refer to this table. The "entity" element indicates that compound element 1112 refers to a table rather than a primitive data type.

Further, the system may automatically map pluralizations of these alternative terms (e.g., "incidents", "tickets") and capitalizations of these terms (e.g., "INCIDENT", "TICKET") without explicit specification in metadata 1110. For example, the system may automatically convert the text in NLQ expressions to lowercase before looking up the expressions in metadata 1110. If such an NLQ expression is not found, pluralized versions of the NLQ expression may be formed and looked up.

Compound element 1114 defines a mapping between the column "opened_by" in table 600 and the terms "opened_by", "opened_by", and "opener". This means that the terms "opened_by", "opened_by", and "opener" can be used in an NLQ expression to refer to this column. The "entity" element indicates that this column stores strings.

Compound element 1116 defines a mapping between the column "urgency" in table 600 and the terms "urgency" and "priority". This means that the terms "urgency" and "priority" can be used in an NLQ expression to refer to this column. The "entity" element indicates that this column stores numbers.

Compound element 1118A defines a mapping between the column "state" in table 600 and the terms "state" and "status". This means that the terms "state" and "status" can be used in an NLQ expression to refer to this column. The "entity" element indicates that this column stores numbers.

Compound element 1118B defines a mapping for values of the column "state" in table 600. These mappings associate strings with the numbers that would usually appear in the column "state". For example, an NLQ expression that includes the string "1" or "new" in a grammatically appropriate location may specify rows in table 600 where the column "state" has a numeric value of 1. Likewise, a query expression that includes the string "2" or "in progress" in a grammatically appropriate location may specify rows in table 600 where the column "state" has a numerical value of 2. The "entity" element indicates that this compound element refers to values.

Compound element 1120 defines a mapping between the column "opened_at" in table 600 and the terms "opened_at", "opened_at", "time opened", and "filed". This means that the terms "opened_at", "opened_at", "time opened", and "filed" can be used in an NLQ expression to refer to this column. The "entity" element indicates that this column stores dates.

These compound elements are presented for purposes of example. In various implementations more compound elements may be present in metadata and these elements may include more alternative terms than shown in FIG. 11B. Further, different metadata may be defined for each table and columns thereof in a database.

Advantageously, the separation of a grammar into rules and associated metadata allows dynamic changes to be made to the grammar without modification of the rules or recompilation of the grammar. Notably, rule modification can be difficult, and is error prone. The embodiments herein allow numerous alternative terms to be added to the grammar by editing the metadata while leaving the rules as is. This results in users who are not experts in BNF grammars being able to extend and customize BNF grammars.

Figure 12A:
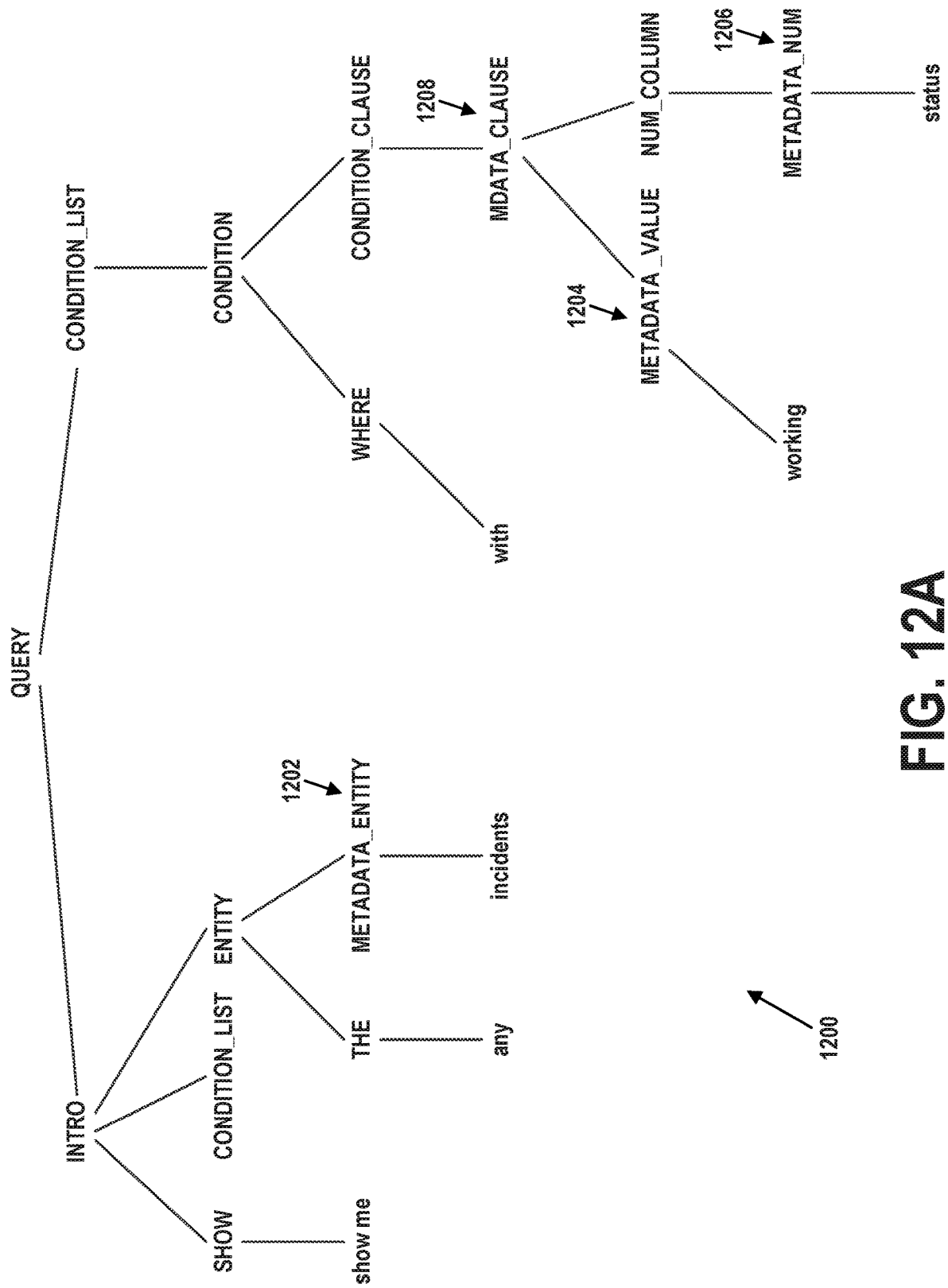
FIG. 12A depicts a natural language query parse tree, in accordance with example embodiments.

To illustrate further, FIG. 12A depicts an example parse tree 1200 for the NLQ expression "show me any incidents with working status". In parse tree 1200 non-terminals that are optional and not used are not shown.

Notably, grammar 1100 is followed to parse the NLQ expression until the metadata-related non-terminals METADATA_ENTITY 1202, METADATA_VALUE 1204, and METADATA_NUM 1206 are reached. For each of these, the "METADATA" prefix indicates that the parsing continues by looking up each in metadata 1110. Doing so results in METADATA_ENTITY 1202 being mapped to the terminal "incident" in accordance with compound element 1112, METADATA_VALUE 1204 being mapped to the terminal "working" in accordance with compound element 1118B, and METADATA_NUM 1206 being mapped to the terminal "status" in accordance with compound element 1118A. The parser also ensures that the ultimate children of MDATA_CLAUSE 1208 that are mapped to metadata all refer to the same column (in this case, the "state" column as specified in compound elements 1118A and 1118B).

Also, the parser stores associations between the metadata-related non-terminals and the associated tables and columns. Thus, METADATA_ENTITY 1202 is associated with the "incident" table (e.g., table 600), METADATA_VALUE 1204 is associated with the "state" column of the "incident" table, and METADATA_NUM 1206 is also associated with the "state" column of the "incident" table.

In total, the metadata-related non-terminals and their associated values in the NLQ expression is enough information for the parser to generate an SQL query from the NLQ expression. Referring again to FIG. 12A, METADATA_ENTITY 1202 identifies a database table that can be specified in a FROM SQL keyword. METADATA_VALUE 1204 and METADATA_NUM 1206 identify a column and associated value, respectively, that can be specified in a WHERE SQL keyword.

As a result, the parser generates the SQL query "SELECT * FROM incident WHERE state=5" from the NLQ expression "show me any incidents with working status". Grammar 1100 is flexible enough for numerous variations of this NLQ expression to parse to the same SQL expression. For example, "please display working state incidents" and "get tickets with a status==5" also result in the SQL query "SELECT * FROM incident WHERE state=5".

In some embodiments, a sorting clause may be specified to control the order in which multiple results are displayed. For example, the above NLQ expression can be expanded to "show me any incidents with working status sorted by time opened". The final four terms of this NLQ expression map to a SORT_CLAUSE non-terminal in grammar 1100.

Figure 12B:
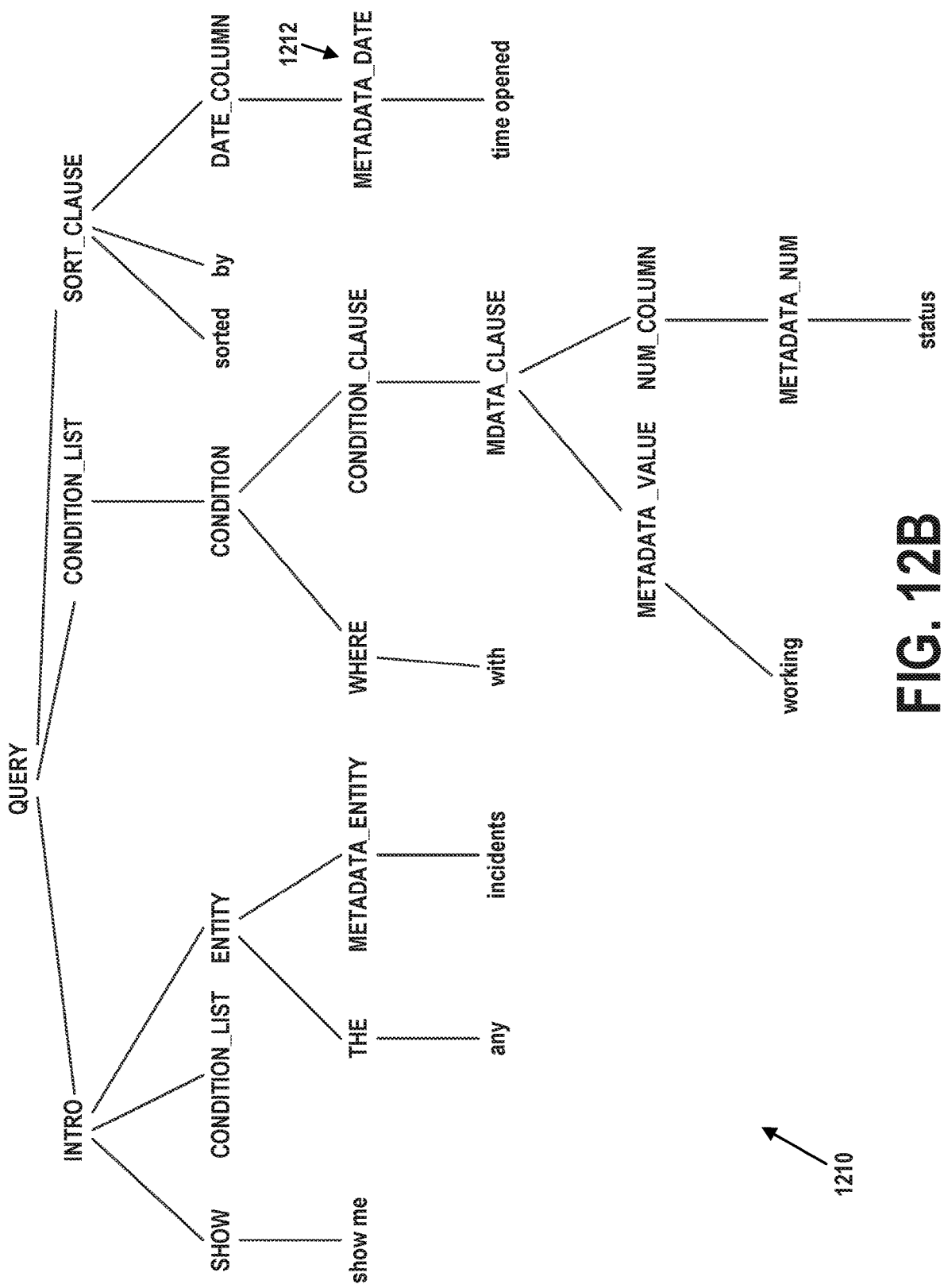
FIG. 12B depicts another natural language query parse tree, in accordance with example embodiments.

FIG. 12B depicts an example parse tree 1210 for this NLQ expression. Notably, the INTRO and CONDITION_LIST subtrees are identical to those of parse tree 1200. The SORT_CLAUSE subtree maps the "sorted by time opened" part of the NLQ expression to the "opened_at" column of table 600. Particularly, METADATA_DATE 1212 is mapped to the terminal "time opened". Thus, METADATA_DATE 1212 defines the "opened_at" column as being the index of an ascending sort (grammar 1100 can be interpreted as only supporting ascending sort operations, but could be extended to support descending sort operations as well). Thus, "show me any incidents with working status sorted by time opened" can be mapped to the SQL expression "SELECT * FROM incident WHERE state=5 ORDERED BY opened_at".

In various embodiments, multiple tables can be specified in an NLQ expression. More or less complex grammars than grammar 1100 may be used. Also, much more extensive metadata specifications than metadata 1110 may be used. As a consequence, NLQ expressions that approach or encompass conversational speech or writing may be supported.

Advantageously, the embodiments herein allow a grammar to be developed for NLQ processing that can be modified to support any database schema through editing of the metadata. Further, by developing customized metadata for various enterprises, the same grammar can be used by these enterprises even if they utilize different computational instances of the remote network management platform. Moreover, a person of limited skill and knowledge of grammars can easily edit and customize the metadata. As a result, a rich set of NLQ expressions can be supported with the same standard grammar, with potentially different sets of NLQ and SQL expressions supported per computational instance.

IX. Example Operations

Figure 13:
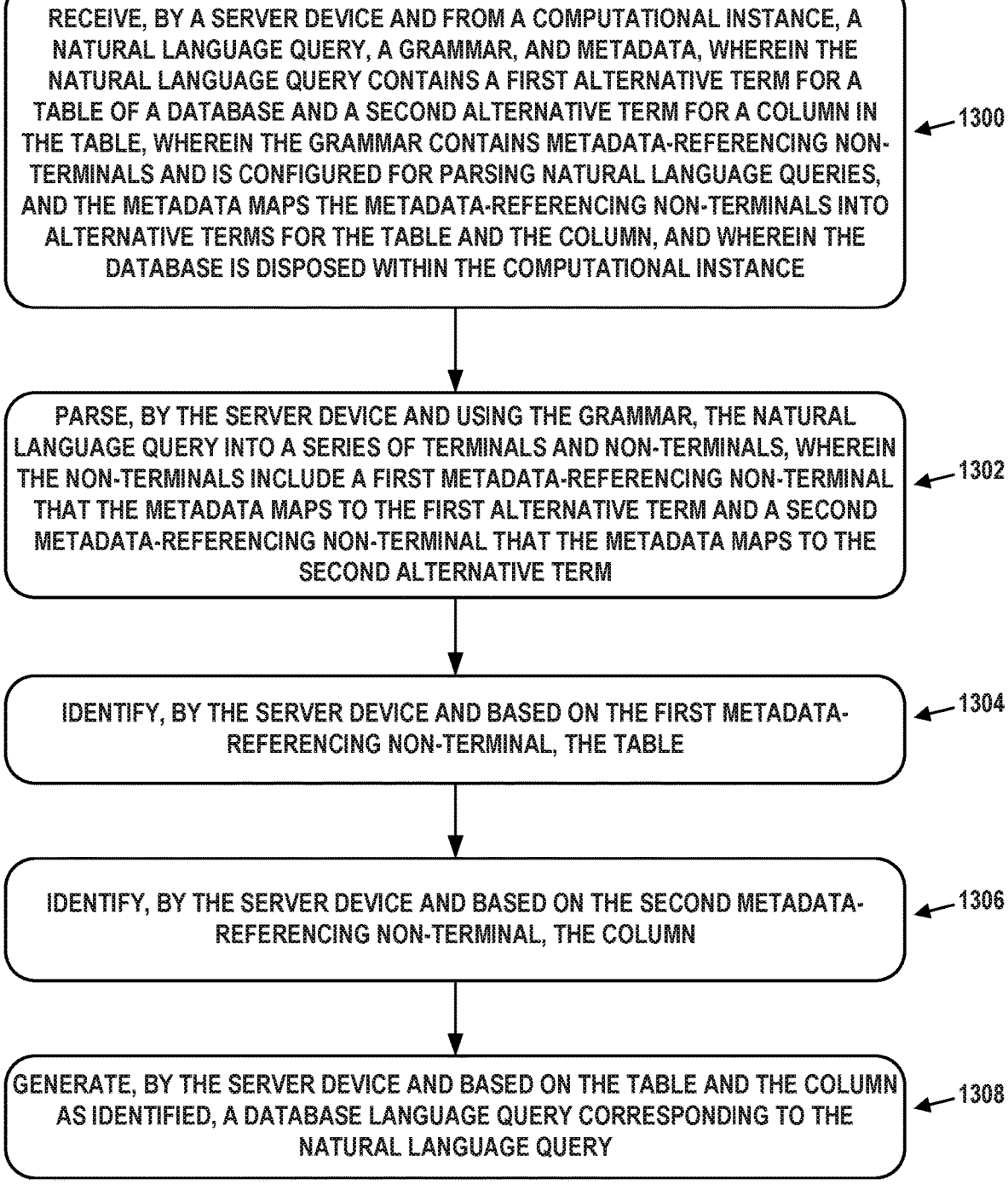
FIG. 13 is a flow chart, in accordance with example embodiments.

FIG. 13 is a flow chart illustrating an example embodiment. The process illustrated by FIG. 13 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 13 may be simplified by the removal of any one or more of the features shown therein. Further, these embodiments may be combined with features, aspects, and/or implementations of any of the previous figures or otherwise described herein.

Block 1300 may involve receiving, from a computational instance, a natural language query, a grammar, and metadata, wherein the natural language query contains a first alternative term for a table of a database and a second alternative term for a column in the table, wherein the grammar contains metadata-referencing non-terminals and is configured for parsing natural language queries, and the metadata maps the metadata-referencing non-terminals into alternative terms for the table and the column, and wherein the database is disposed within the computational instance.

Block 1302 may involve parsing, using the grammar, the natural language query into a series of terminals and non-terminals, wherein the non-terminals include a first metadata-referencing non-terminal that the metadata maps to the first alternative term and a second metadata-referencing non-terminal that the metadata maps to the second alternative term.

Block 1304 may involve identifying, by the server device and based on the first metadata-referencing non-terminal, the table.

Block 1306 may involve identifying, by the server device and based on the second metadata-referencing non-terminal, the column.

Block 1308 may involve generating, by the server device and based on the table and the column as identified, a database language query corresponding to the natural language query.

Some embodiments may involve providing, to the computational instance, the database language query, wherein reception of the database language query causes the computational instance to: (i) provide, to the database, the database language query, and (ii) receive, from the database, results specifying one or more rows of the table matching the database language query.

In some embodiments, the database language query causes the database to search the table and filter the results based on a condition specified in the database language query and associated with the column.

In some embodiments, the database language query causes the database to search the table and sort the results based on a sort clause specified in the database language query and associated with the column.

In some embodiments, the metadata maps the first metadata-referencing non-terminal to at least two of the alternative terms for the table, and the metadata maps the second metadata-referencing non-terminal to at least two of the alternative terms for the column.

In some embodiments, the natural language query also contains a third alternative term for a further column in the table, and the non-terminals may also include a third metadata-referencing non-terminal that the metadata maps to the third alternative term. These embodiments may further involve identifying, based on the third metadata-referencing non-terminal, the further column, wherein the database language query is generated also based on the further column as identified.

In some embodiments, the natural language query also contains a third alternative term for a value associated with the column, and the non-terminals also include a third metadata-referencing non-terminal that the metadata maps to the third alternative term. These embodiments may further involve identifying, based on the third metadata-referencing non-terminal, the value, wherein the database language query specifies that the column contains the value.

In some embodiments, the database language query is a structured query language (SQL) query, wherein a FROM keyword in the SQL query is associated with the table and a WHERE keyword in the SQL query is associated with the column.

Some embodiments may further involve receiving, from a second computational instance, a second natural language query, the grammar, and second metadata, wherein the second natural language query contains a third alternative term for a second table of a second database and a fourth alternative term for a second column of the second table, and wherein the second metadata maps the metadata-referencing non-terminals into alternative terms for the second table and the second column, wherein the database is disposed within the second computational instance. These embodiments may also involve parsing, using the grammar, the second natural language query into a second series of the terminals and the non-terminals, wherein the non-terminals include a third metadata-referencing non-terminal that the second metadata maps to the third alternative term and a fourth metadata-referencing non-terminal that the second metadata maps to the fourth alternative term. These embodiments may also involve identifying, based on the third metadata-referencing non-terminal, the second table. These embodiments may also involve identifying, based on the fourth metadata-referencing non-terminal, the second column. These embodiments may also involve generating, based on the second table and the second column as identified, a second database language query corresponding to the second natural language query.

In some embodiments, the metadata can be updated without the grammar being updated.

X. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
    one or more hardware processors; and
    one or more memories, the one or more memories storing instructions that, when executed by the one or more hardware processors, causes the one or more hardware processors to perform operations comprising:
        receiving, from a client device, a natural language query;
        retrieving metadata associated with a set of grammar rules;
        transforming, by applying the set of grammar rules, the natural language query into a series of terminals and non-terminals;
        identifying, based on one or more of the terminals in the series and one or more of the non-terminals in the series, a database table and a column of the database table, wherein the metadata maps a first non-terminal of the one or more of the non-terminals to a first set of at least two alternative terms for the identified database table, and wherein the metadata maps a second non-terminal of the one or more of the non-terminals to a second set of at least two alternative terms for the identified column;
        generating, based on the series of the terminals and the non-terminals, a database language query corresponding to the natural language query;
        executing the generated database language query on one or more databases, wherein the generated database language query causes the one or more hardware processors to search the identified database table and filter results based on a condition specified in the generated database language query and associated with the identified column; and
        transmitting, to the client device, the results of executing the database language query on the one or more databases.

2. The system of claim 1, wherein the generated database language query causes the one or more hardware processors to search the identified database table and sort a set of records of the results based on a sort clause specified in the generated database language query and associated with the identified column.

3. The system of claim 1, wherein the metadata references additional non-terminals in the set of grammar rules.

4. The system of claim 1, wherein the natural language query comprises an additional alternative term for an additional column of the identified database table, wherein the one or more of the non-terminals comprise a third non-terminal that the metadata maps to the additional alternative term, and wherein the operations comprise:
    identifying, based on the third non-terminal, the additional column, wherein the generated database language query is generated based on the identified additional column.

5. The system of claim 1, wherein the natural language query comprises an additional alternative term for a value associated with the identified column, wherein the one or more of the non-terminals comprise a third non-terminal that the metadata maps to the additional alternative term, and wherein the operations comprise:
    identifying, based on the third non-terminal, the value associated with the identified column.

6. The system of claim 1, wherein the set of grammar rules is context-free and, when applied by the one or more hardware processors, causes the one or more hardware processors to associate each of the one or more of the non-terminals with respective sequences including some of the one or more of the terminals, or some of the one or more of the non-terminals, or both.

7. The system of claim 1, wherein the generated database language query is a structured query language (SQL) query, wherein a FROM keyword in the SQL query is associated with the identified database table and a WHERE keyword in the SQL query is associated with the identified column.

8. The system of claim 1, wherein the natural language query is received from the client device to a central computational instance via a customer computational instance.

9. A method comprising:
    receiving, via a server device, a natural language query;
    retrieving metadata associated with a set of grammar rules;
    parsing, via the server device, by applying the set of grammar rules, the natural language query into a series of terminals and non-terminals;
    identifying, based on one or more of the terminals in the series and one or more of the non-terminals in the series, a database table and a column of the database table, wherein the metadata maps a first non-terminal of the one or more of the non-terminals to a first set of at least two alternative terms for the identified database table, and wherein the metadata maps a second non-terminal of the one or more of the non-terminals to a second set of at least two alternative terms for the identified column;

generating, via the server device and based on the series of the terminals and the non-terminals, a database language query corresponding to the natural language query;

executing the generated database language query on one or more databases, wherein the generated database language query causes the server device to search the identified database table and filter results based on a condition specified in the generated database language query and associated with the identified column; and transmitting, to a client device, the results of executing the database language query on the one or more databases.

10. The method of claim 9, wherein the generated database language query causes the server device to search the identified database table and sort a set of records of the results based on a sort clause specified in the generated database language query and associated with the identified column.

11. The method of claim 9, wherein the metadata references additional non-terminals in the set of grammar rules.

12. The method of claim 9, wherein the natural language query comprises an additional alternative term for an additional column of the identified database table, wherein the one or more of the non-terminals comprise a third non-terminal that the metadata maps to the additional alternative term, and wherein the method comprises:

identifying, based on the third non-terminal, the additional column, wherein the generated database language query is generated based on the identified additional column.

13. The method of claim 9, wherein the natural language query comprises an additional alternative term for a value associated with the identified column, wherein the one or more of the non-terminals comprise a third non-terminal that the metadata maps to the additional alternative term, and wherein the method comprises:

identifying, based on the third non-terminal, the value associated with the identified column.

14. An article of manufacture including a non-transitory computer-readable medium, having stored thereon program instructions that, upon execution by a server device, cause the server device to perform operations comprising:

receiving, via the server device, a natural language query;

retrieving metadata associated with a set of grammar rules;

parsing, via the server device by applying the set of grammar rules, the natural language query into a series of terminals and non-terminals;

identifying, based on one or more of the terminals in the series and one or more of the non-terminals in the series, a database table and a column of the database table, wherein the metadata maps a first non-terminal of the one or more of the non-terminals to a first set of at least two alternative terms for the identified database table, and wherein the metadata maps a second non-terminal of the one or more of the non-terminals to a second set of at least two alternative terms for the identified column;

generating, via the server device and based on the series of the terminals and the non-terminals, a database language query corresponding to the natural language query;

executing the generated database language query on one or more databases, wherein the generated database language query causes the server device to search the identified database table and filter results based on a condition specified in the generated database language query and associated with the identified column; and transmitting, to a client device, the results of executing the databased language query on the one or more databases.

15. The article of manufacture of claim 14, wherein the generated database language query causes the server device to search the identified database table and sort a set of records of the results based on a sort clause specified in the generated database language query and associated with the identified column.

* * * * *